(12) United States Patent
Misaki

(10) Patent No.: US 9,383,878 B2
(45) Date of Patent: Jul. 5, 2016

(54) TOUCH PANEL AND TOUCH PANEL EQUIPPED DISPLAY DEVICE

(71) Applicant: Sharp Kabushiki Kaisha, Osaka-shi, Osaka (JP)

(72) Inventor: Katsunori Misaki, Yonago (JP)

(73) Assignee: Sharp Kabushiki Kaisha, Osaka (JP)

( * ) Notice: Subject to any disclaimer, the term of this patent is extended or adjusted under 35 U.S.C. 154(b) by 150 days.

(21) Appl. No.: 14/366,327

(22) PCT Filed: Dec. 17, 2012

(86) PCT No.: PCT/JP2012/082701
§ 371 (c)(1),
(2) Date: Jun. 18, 2014

(87) PCT Pub. No.: WO2013/094570
PCT Pub. Date: Jun. 27, 2013

(65) Prior Publication Data
US 2014/0313442 A1    Oct. 23, 2014

(30) Foreign Application Priority Data

Dec. 21, 2011   (JP) ................................. 2011-280168

(51) Int. Cl.
*G06F 3/044* (2006.01)
*G06F 3/041* (2006.01)
*G02F 1/1335* (2006.01)

(52) U.S. Cl.
CPC .......... *G06F 3/044* (2013.01); *G02F 1/133512* (2013.01); *G06F 3/041* (2013.01)

(58) Field of Classification Search
CPC .................... G02F 1/136209; G02F 1/136286; G02F 1/133512; G02F 1/133345; G02F 1/1335; G02F 1/133509; G02F 1/133514; G02F 1/134309; G02F 1/134336; G02F 1/1345; G02F 1/1333; G02F 1/1343; G02F 1/133; G02F 1/13338; G02F 2001/136218; G02F 2001/13629; G02F 3/041; G02F 3/044; G02F 3/0412; G02F 3/047; G02F 2203/04103; G02F 2203/04111; G02F 2203/04107; G02F 2203/04112; H01L 27/124; G09G 2300/0426; G09G 2310/0218

USPC ........... 257/72, 59, 71; 349/139, 33, 12, 110, 349/149, 151, 44, 143, 158, 138, 43; 345/173, 88, 100, 174, 207, 55; 359/254

See application file for complete search history.

(56) References Cited

U.S. PATENT DOCUMENTS

| 8,912,541 | B2 * | 12/2014 | Yamazaki | ........... H01L 27/1225 257/43 |
| 2011/0096017 | A1 * | 4/2011 | Li | ............................ G06F 3/044 345/174 |
| 2011/0099805 | A1 | 5/2011 | Lee | |
| 2012/0073866 | A1 * | 3/2012 | Hirai | ........................ G06F 3/044 174/257 |

FOREIGN PATENT DOCUMENTS

| JP | 2011-075809 A | 4/2011 |
| WO | 2010/095798 A1 | 8/2010 |

OTHER PUBLICATIONS

Official Communication issued in International Patent Application No. PCT/JP2012/082701, mailed on Mar. 19, 2013.

* cited by examiner

*Primary Examiner* — Thoi Duong
(74) *Attorney, Agent, or Firm* — Keating & Bennett, LLP

(57) ABSTRACT

An arrangement of a touch panel with improved sensitivity is provided. A touch panel (1) includes: an insulating substrate (10); a first light-shielding portion extending in a first direction; a second light-shielding portion extending in a second direction, the second direction crossing the first direction; a plurality of first insular electrodes (110) arranged in the first direction; a plurality of second insular electrodes (120) arranged in the second direction; a first metal film (141) in contact with the plurality of first insular electrodes (110) and extending in the first direction; a second metal film (152) in contact with the plurality of second insular electrodes (120) and extending in the second direction; and an insulating film (152) provided at least at a crossing of the first metal film (151) and the second metal film (152) as in a plan view for providing electrical insulation between the first metal film (151) and the second metal film (152).

18 Claims, 26 Drawing Sheets

TOUCH PANEL AND TOUCH PANEL EQUIPPED DISPLAY DEVICE

TECHNICAL FIELD

The present invention relates to a touch panel and a touch panel equipped display device, and more particularly, to an electrostatic capacitance type touch panel and touch panel equipped display device.

BACKGROUND ART

Recently, electrostatic capacitance type touch panels have become popular as they enable multipoint detection or are highly practical for other reasons.

One known type of a touch panel equipped display device is an in-cell touch panel where a substrate that constitutes a display device also has the functionality of a touch panel. In-cell touch panels have a relatively small number of components, which makes it relatively easy to make a thinner device or a device with increased transmittance.

JP 2011-75809 A describes a liquid crystal display panel with liquid crystal sandwiched between two colorless and transparent substrates and a color filter layer for color display on the inner surface of one of the substrates where an electrostatic capacitance type touch panel is provided between the substrate having the color filter layer and the color filter layer.

DISCLOSURE OF THE INVENTION

An electrostatic capacitance type touch panel includes an insulating substrate and sensor electrodes arranged in a grid. Based on a change in the electrostatic capacitance formed by one or more of these electrodes and a finger or the like located close to the touch panel, the touch panel detects the position of the finger or the like.

These sensor electrodes lie over the display region of the display device. In view of this, the sensor electrodes are typically formed of a transparent conductive film made of indium tin oxide (ITO), indium zinc oxide (IZO) or the like. The transparent conductive film has a lower conductivity than metal or the like. The sensor electrodes must be relatively thin so as to be less visible to the viewer. The thinner the sensor electrodes, the higher the electric resistance of the sensor electrodes becomes.

Thus, when a larger touch panel is made, the sensitivity deteriorates.

An object of the present invention is to provide an arrangement of a touch panel with improved sensitivity.

The touch panel disclosed herein includes: an insulating substrate; a first light-shielding portion extending in a first direction; a second light-shielding portion extending in a second direction, the second direction crossing the first direction; a plurality of first insular electrodes arranged in the first direction; a plurality of second insular electrodes arranged in the second direction; a first metal film in contact with the plurality of first insular electrodes and extending in the first direction; a second metal film in contact with the plurality of second insular electrodes and extending in the second direction; and an insulating film provided at least at a crossing of the first and second metal films as in a plan view for providing electrical insulation between the first and second metal films. The first metal film overlies the first light-shielding portion as in a plan view, the first metal film has a smaller width than the first light-shielding portion, the second metal film overlies the second light-shielding portion as in a plan view, the second metal film has a smaller width than the second light-shielding portion, and the first and second insular electrodes are made of transparent conductive film.

The present invention provides an arrangement of a touch panel with improved sensitivity.

EMBODIMENTS FOR CARRYING OUT THE INVENTION

Figure 1:
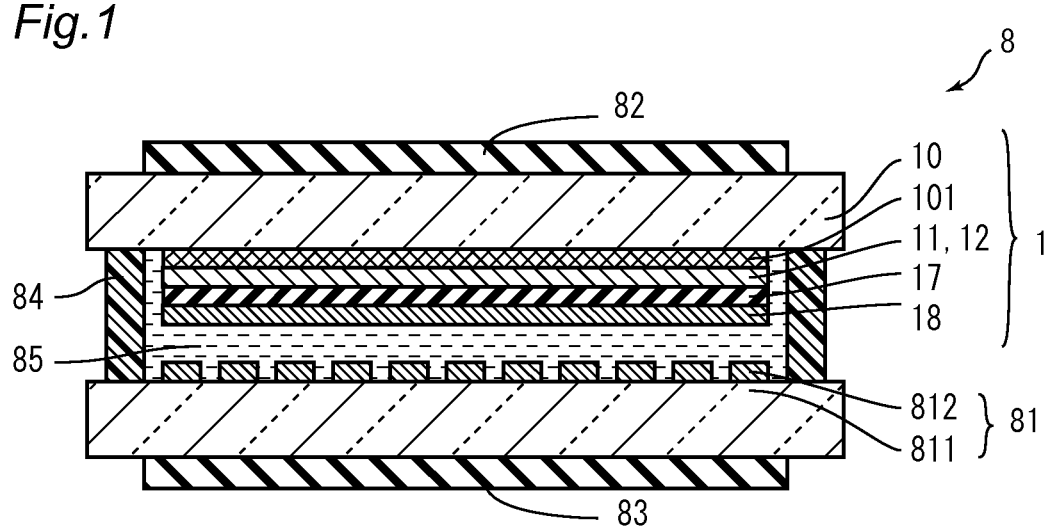
FIG. 1 is a schematic cross-sectional view of a touch panel equipped display device according to an embodiment of the present invention.

A touch panel according to an embodiment of the present invention includes: an insulating substrate; a first light-shielding portion extending in a first direction; a second light-shielding portion extending in a second direction, the second direction crossing the first direction; a plurality of first insular electrodes arranged in the first direction; a plurality of second insular electrodes arranged in the second direction; a first metal film in contact with the plurality of first insular electrodes and extending in the first direction; a second metal film in contact with the plurality of second insular electrodes and extending in the second direction; and an insulating film provided at least at a crossing of the first and second metal films as in a plan view for providing electrical insulation between the first and second metal films. The first metal film overlies the first light-shielding portion as in a plan view, the first metal film has a smaller width than the first light-shielding portion, the second metal film overlies the second light-shielding portion as in a plan view, the second metal film has a smaller width than the second light-shielding portion, and the first and second insular electrodes are made of transparent conductive film (first arrangement)

In the above arrangement, first and second metal films are in contact with first and second insular electrodes, respectively. This will reduce the electrical resistance of the first and second insular electrodes, thereby improving sensitivity. The first and second metal films overlie the first and second light-shielding portions, respectively, as in a plan view. Further, the first and second metal films have smaller widths than the first and second light-shielding portions, respectively. This will prevent the metal films, which have a relatively high reflectance, from being visible to the viewer. Furthermore, there will be no reduction in the aperture ratio of the display device.

Starting from the first arrangement above, the first and second light-shielding portions may be provided on the substrate, and the touch panel may further include a planarizing film covering the first and second light-shielding portions and the substrate (second arrangement).

Starting from the first or second arrangement above, it is preferable that the plurality of first insular electrodes are interconnected in the first direction (third arrangement).

According to the above arrangement, the first insular electrodes are connected with each other by the first metal film and, in addition, the first insular electrodes are interconnected. This redundant construction will increase reliability and improve yield.

Starting from one of the first to third arrangements above, the first metal film may be located in a layer higher than that of the first insular electrodes and lower than that of the insulating film, and the second metal film may be located in a layer higher than that of the second insular electrodes and that of the insulating film (fourth arrangement).

Starting from one of the first to third arrangements above, the first metal film may be located in a layer lower than that of the first insular electrodes and that of the insulating film, and the second metal film may be located in a layer higher than that of the second insular electrodes and that of the insulating film (fifth arrangement).

Starting from one of the first to third arrangements above, the first metal film may be located in a layer higher than that of the first insular electrodes and that of the insulating film, and the second metal film may be located in a layer lower than that of the second insular electrodes and that of the insulating film (sixth arrangement).

Starting from one of the first to sixth arrangements above, it is preferable that the touch panel further includes a third metal film in contact with at least one of a) and b): a) the first insular electrodes; and b) the first metal film, the third metal film overlying the first light-shielding portion as in a plan view and having a smaller width than the first light-shielding portion (seventh arrangement).

According to the above arrangement, the first and third metal films provide a redundant construction, thereby increasing reliability and improving yield.

Starting from one of the first to seventh arrangements above, it is preferable that the touch panel further includes a fourth metal film in contact with at least one of c) and d): c) the second insular electrodes; and d) the second metal film, the fourth metal film overlying the second light-shielding portion as in a plan view and having a smaller width than the second light-shielding portion (eighth arrangement).

According to the above arrangement, the second and fourth metal films provide a redundant construction, thereby increasing reliability and improving yield.

Starting from one of the first to eighth arrangements above, the insulating film may cover the first and second insular electrodes and include an opening for providing at least one of e) and f): e) a connection between the first insular electrodes and the first metal film; and f) a connection between the second insular electrodes and the second metal film (ninth arrangement).

Starting from one of the first to ninth arrangements above, it is preferable that the touch panel further includes a line made of the same material as at least one of the first and second metal films (tenth arrangement).

According to the above arrangement, one of the first and second metal films may be fabricated by the same step as the line. This will simplify the manufacturing process.

Starting from the tenth arrangement above, it is preferable that the touch panel further includes a transparent conductive film in contact with the line and overlying the line as in a plan view (eleventh arrangement).

According to the above arrangement, the line and transparent conductive film provide a redundant construction, thereby increasing reliability and improving yield.

Starting from the tenth or eleventh arrangement above, it is preferable that the touch panel further includes a fifth metal film in electrical contact with the line and located in a layer different from that for the line (twelfth arrangement).

According to the above arrangement, the line and fifth metal film provide a redundant construction, thereby increasing reliability and improving yield.

Starting from one of the first to twelfth arrangements above, the touch panel may further include a color filter layer (thirteenth arrangement).

Starting from the thirteenth arrangement above, it is preferable that the insulating film has a width as measured in the first direction that is smaller than a width of the second light-shielding portion, or has a width as measured in the second direction that is smaller than a width of the first light-shielding portion (fourteenth arrangement).

If a color filter layer is formed over the first and second metal films and the insulating film, the thickness of the color filter layer varies, which in turn varies the tone. According to the above arrangement, all of these components are located to overlie the first or second light-shielding portion such that the variations of the tone of the color filter layer are not perceivable to the viewer. This will eliminate the necessity to form a separate film for planarization, thereby simplifying the manufacturing process.

A touch panel equipped display device according to an embodiment of the present invention includes: the touch panel according to one of the first to fourteenth arrangements above; a common electrode provided on the touch panel; a thin-film transistor substrate provided to pair up with the touch panel; and liquid crystal sandwiched between the touch panel and the thin-film transistor substrate (first arrangement of the touch panel equipped display device).

Starting from the first arrangement of the touch panel equipped display device above, it is preferable that the thin-film transistor substrate includes an oxide semiconductor layer containing indium gallium zinc oxide (second arrangement of the touch panel equipped display device).

Indium gallium zinc oxide has a relatively large electron mobility and relatively small variations of properties. The use of indium gallium zinc oxide will make it possible to make a larger touch panel equipped display device with increased precision.

Embodiments

Now, embodiments of the present invention will be described in detail with reference to the drawings. The same or corresponding components in the drawings are labeled with the same characters and their description will not be repeated. For ease of explanation, the drawings to which reference will be made hereinafter show simplified or schematic representation, or do not show some components. The size ratios of the components shown in the drawings do not necessarily represent the actual size ratios.

[Overall Construction]

FIG. 1 is a schematic cross-sectional view of a touch panel equipped display device 8 according to an embodiment of the present invention. The touch panel equipped display device 8 includes a touch panel 1, a thin-film transistor (TFT) substrate 81, polarizers 82 and 83, seals 84 and liquid crystal 85.

The touch panel 1 and TFT substrate 81 are located so as to have major surfaces facing each other. The seals 84 are provided along the periphery of the touch panel 1 and TFT substrate 81 and enclose the liquid crystal 85. The polarizers 82 and 83 are provided on the outer major surfaces of the touch panel 1 and TFT substrate 81, respectively.

The touch panel 1, which will be described in detail later below, is generally an electrostatic capacitance type touch panel including an insulating substrate 10 and a group of sensor electrodes (X electrode sets 11 and Y electrode sets 12, for example). The X and Y electrode sets 11 and 12 are arranged in a grid. The X and Y electrode sets 11 and 12 may form an electrostatic capacitor with a finger or the like located close to them, with the substrate 10 in between. Based on changes in its electrostatic capacitance, the touch panel 1 detects the position of the finger or the like.

The touch panel 1 further includes a black matrix 101, a color filter 17, a common electrode 18 and other components.

The TFT substrate 81 includes an insulating substrate 811, pixel electrodes 812 and TFTs, not shown. The pixel electrodes 812 and TFTs are arranged in a matrix on the substrate 811. Although the TFTs may include an amorphous silicon or an oxide semiconductor, they preferably include an oxide semiconductor, particularly an oxide semiconductor containing indium gallium zinc oxide (IGZO or IZGO). IGZO has a relatively large electron mobility and relatively small variations of properties. Accordingly, it makes it easy to increase the size of and/or the precision in the touch panel equipped display device 8.

The touch panel equipped display device 8 drives the TFTs on the TFT substrate 81 to generate an electric field between a desired pixel electrode 812 and the common electrode 18. This field changes the orientation of the liquid crystal 85. Light entering the device through the polarizer 83 is polarized by the polarizer 83 in a particular direction. The polarization direction of light entering the liquid crystal 85 is influenced by the orientation of the liquid crystal 85. Only those components of light that are polarized in a particular direction pass through the polarizer 82.

In this way, a desired pixel electrode 812 may be used to cause the touch panel equipped display device 8 to be transparent or non-transparent to light. The light that has passed through the pixel electrode 812 is colored by the color filter 17. Color filters 17 of a plurality of colors, such as red, green and blue may be disposed on a regular basis to allow various colors to be displayed by additive color mixing. The black matrix 101 blocks light that comes through locations other than those with the pixel electrodes 812 to improve contrast.

Thus, the touch panel equipped display device 8 according to the present embodiment is an in-cell touch panel equipped display device where a group of sensor electrodes of a touch panel are incorporated by a so-called color filter substrate of a liquid crystal display device.

Construction of Touch Panel

First Embodiment

Figure 2:
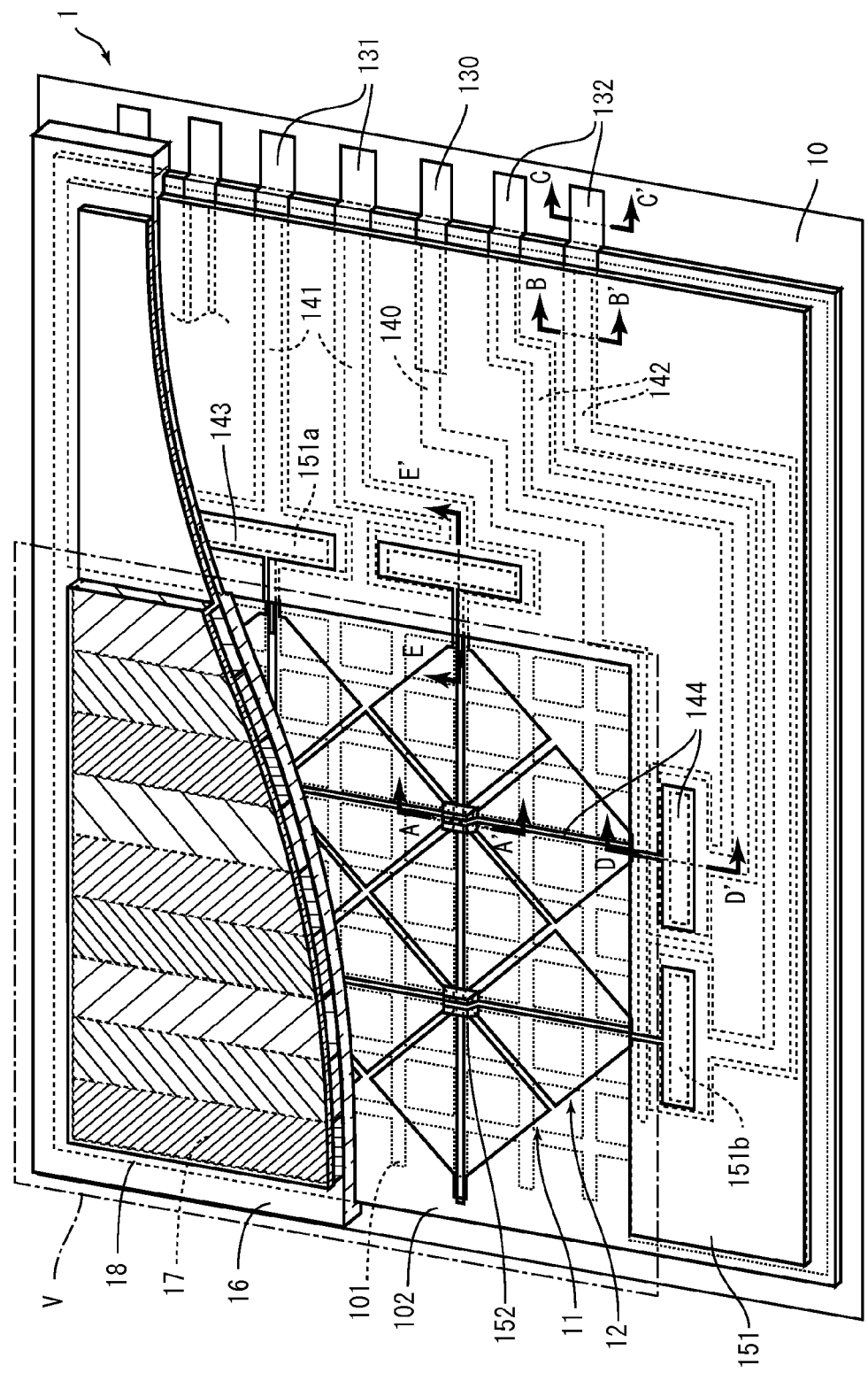
FIG. 2 is a schematic partially cut-away view of the touch panel according to the first embodiment of the present invention.
Figure 3:
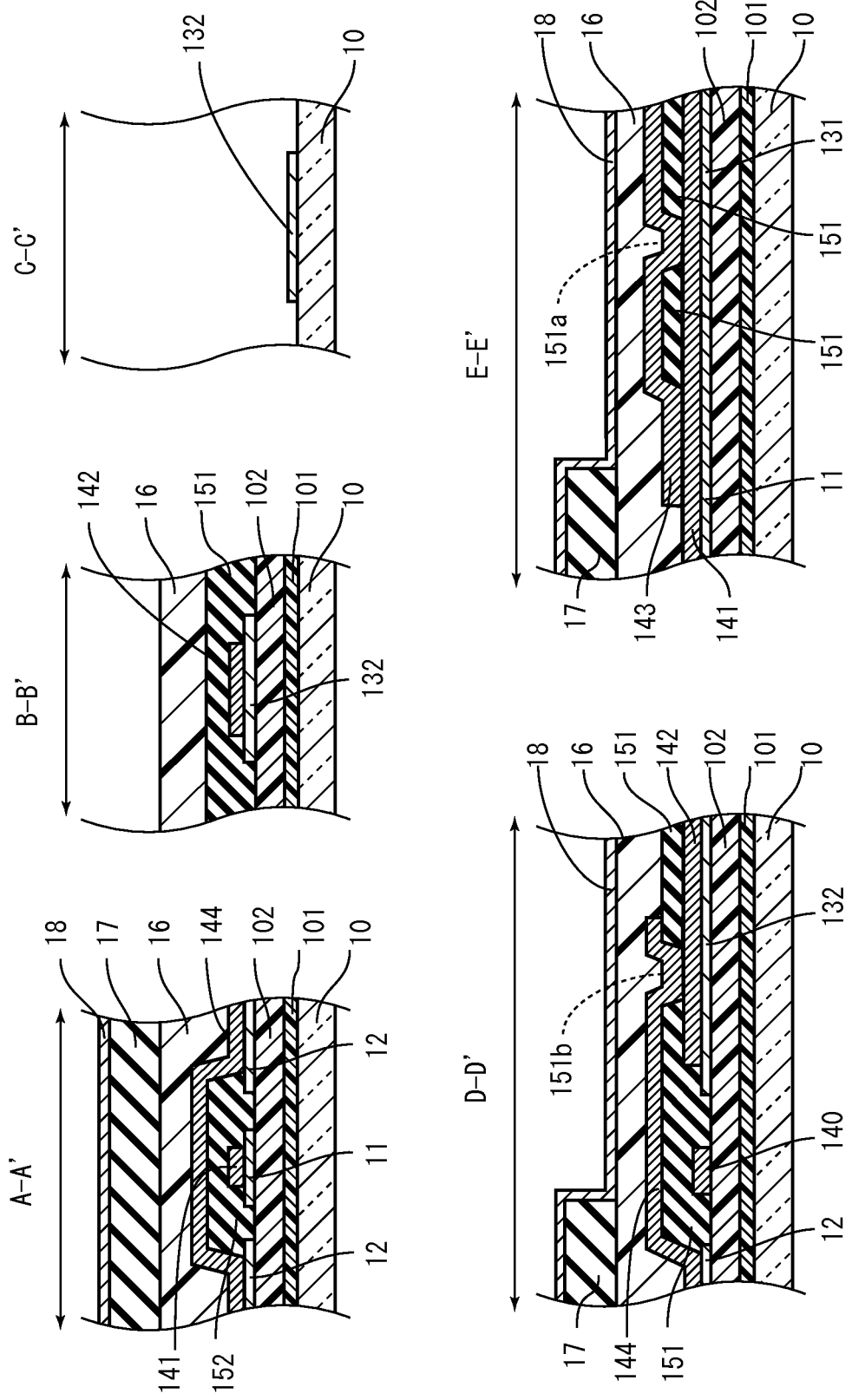
FIG. 3 shows cross-sectional views of the touch panel of FIG. 2 taken along lines A-A', B-B', C-C', D-D' and E-E'.

Now, the construction of the touch panel 1 will be described in detail. FIG. 2 is a schematic partially cut-away view of the touch panel 1 according to the first embodiment of the present invention. FIG. 3 shows cross-sectional views of the touch panel of FIG. 2 taken along lines A-A', B-B', C-C', D-D' and E-E'. The touch panel 1 includes a substrate 10, a black matrix 101, a planarizing film 102, X electrode sets 11, Y electrode sets 12, terminals 130 to 132, lines 140 to 144, insulating films 151 and 152, a protection film 16, a color filter 17 and a common electrode 18.

As shown in FIG. 2, the touch panel 1 has a display region V and the other region, i.e. a peripheral region. The X and Y electrode sets 11 and 12, which constitute sensor electrodes, are located in the display region V.

The X and Y electrode sets 11 and 12 are electrically connected, via the lines 141 to 144 and other components, with the terminals 131 and 132 located near an edge of the substrate 10. The terminal 130 and line 140 are not connected with any of the X and Y electrode sets 11 and 12. They serve as a shield line for blocking electromagnetic noise. The terminals 130 to 132 are connected with drive circuitry via a flexible printed circuit (FPC), not shown, or the like.

Figure 4A:
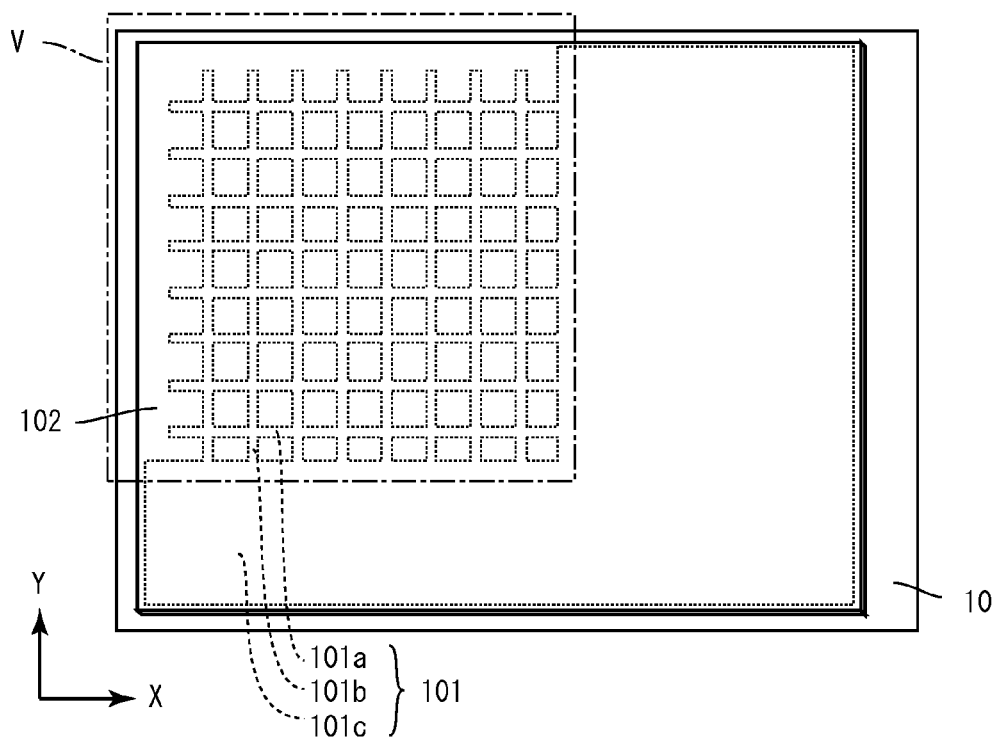
FIG. 4A is a plan view of the substrate, black matrix and planarizing film of the touch panel according to the first embodiment of the present invention.

FIG. 4A is a plan view of the substrate 10, black matrix 101 and planarizing film 102 of the touch panel 1. As shown in FIG. 4A, the black matrix 101 and planarizing film 102 are formed above the substrate 10. A left-to-right direction in FIG. 4A will be hereinafter referred to as an X direction, while a top-to-bottom direction in FIG. 4A will be referred to as a Y direction.

The black matrix 101 includes first light-shielding portions 101a, second light-shielding portions 101b and a third light-shielding portion 101c.

In the display region V, a plurality of first light-shielding portions 101a extending in an X direction and a plurality of second light-shielding portions 101b extending in a Y direction form a grid. The first and second light-shielding portions 101a and 101b are disposed in such a way that each of the rectangular regions defined by them corresponds to a unit pixel of the display device 8.

A uniform light-shielding portion 101c is formed outside the display region V, i.e. in the peripheral region.

A planarizing film 102 covers the entire black matrix 101 and a portion of the substrate 10.

Figure 4B:
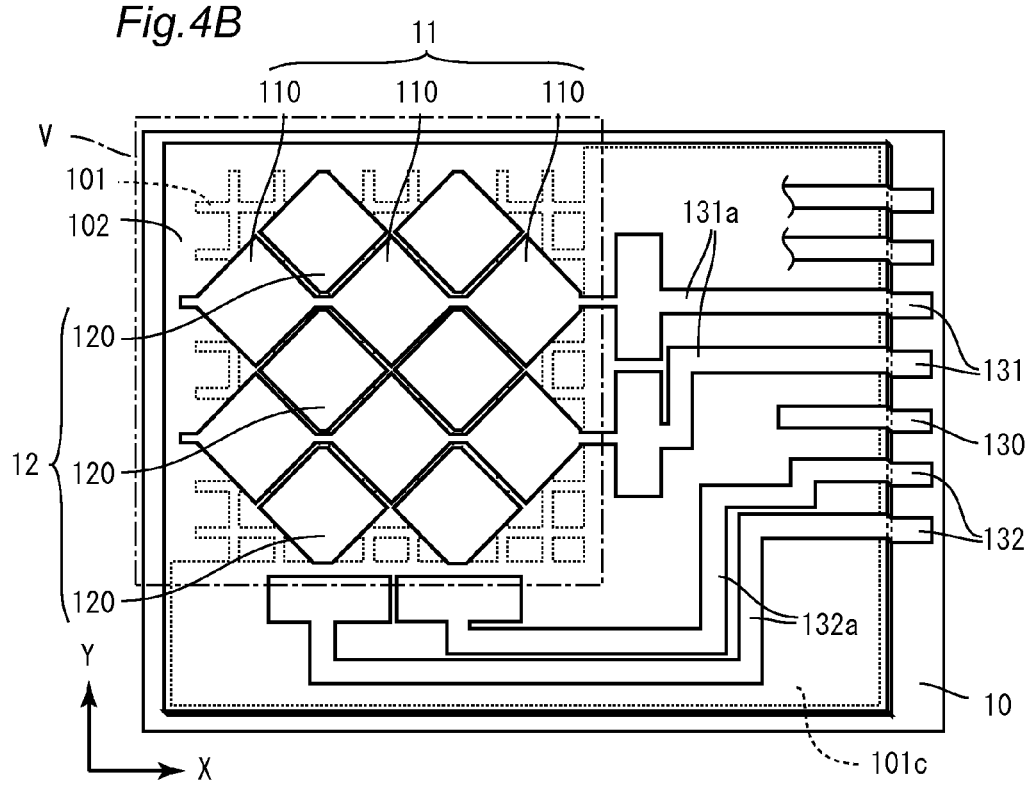
FIG. 4B is a plan view of the components of FIG. 4A as well as X electrode sets, Y electrode sets and terminals.

FIG. 4B is a plan view of the components of FIG. 4A as well as X electrode sets 11, Y electrode sets 12 and terminals 130 to 132. As shown in FIG. 4B, the X and Y electrode sets 11 and 12 are provided above the planarizing film 102. The terminals 130 to 132 are formed over the planarizing film 102 and substrate 10.

Each X electrode set 11 includes a plurality of insular electrodes 110 arranged in an X direction. Analogously, each Y electrode set 12 includes a plurality of insular electrodes 120 arranged in a Y direction. The insular electrodes 110 are interconnected in an X direction. On the other hand, the insular electrodes 120 are separated from each other.

The terminals 131 and 132 are elongated to extend from near an edge of the substrate 10 to near the X and Y electrode sets 11 and 12. The terminals 131 are connected with the X electrode sets 11, while the terminals 132 are not connected with the Y electrode sets 12. Those portions of the terminals 131 and 132 that overlie the third light-shielding portion 101c as in a plan view will be hereinafter referred to as extending portions 131a and 132a, respectively.

Figure 4C:
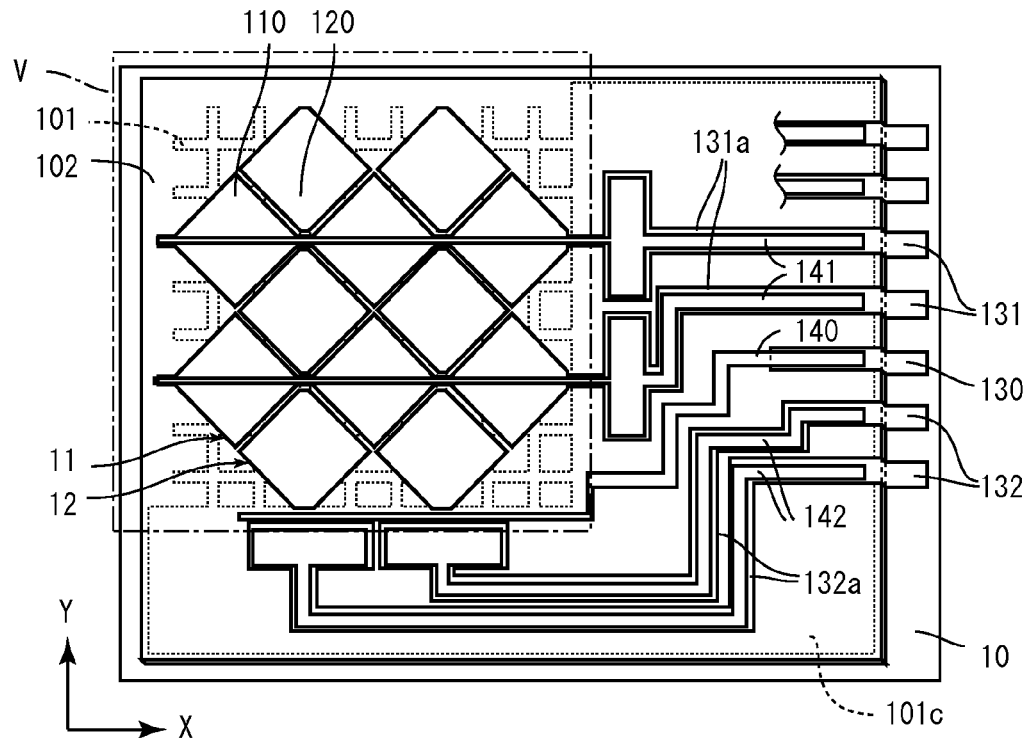
FIG. 4C is a plan view of the components of FIG. 4B as well as some lines.

FIG. 4C is a plan view of the components of FIG. 4B as well as some lines 140 to 142. As shown in FIG. 4C, the lines 141 are formed on the X electrode sets 11 and the extending portions 131a of the terminals 131. The lines 142 are formed on the extending portions 132a of the terminals 132. The line 140 is formed on the terminal 130 and the planarizing film 102.

Each line 141 overlies the corresponding extending portion 131a. Further, in the display region V, the line 141 extends in an x direction to be in contact with the insular electrodes 110 of the corresponding X electrode set 11. In the display region V, the line 141 overlies the corresponding first light-shielding portion 101a as in a plan view and has a smaller width than the first light-shielding portion 101a.

Each line 142 overlies the corresponding extending portion 132a. Unlike the lines 141, the lines 142 are not connected with the Y electrode sets 12 or the like.

Figure 4D:
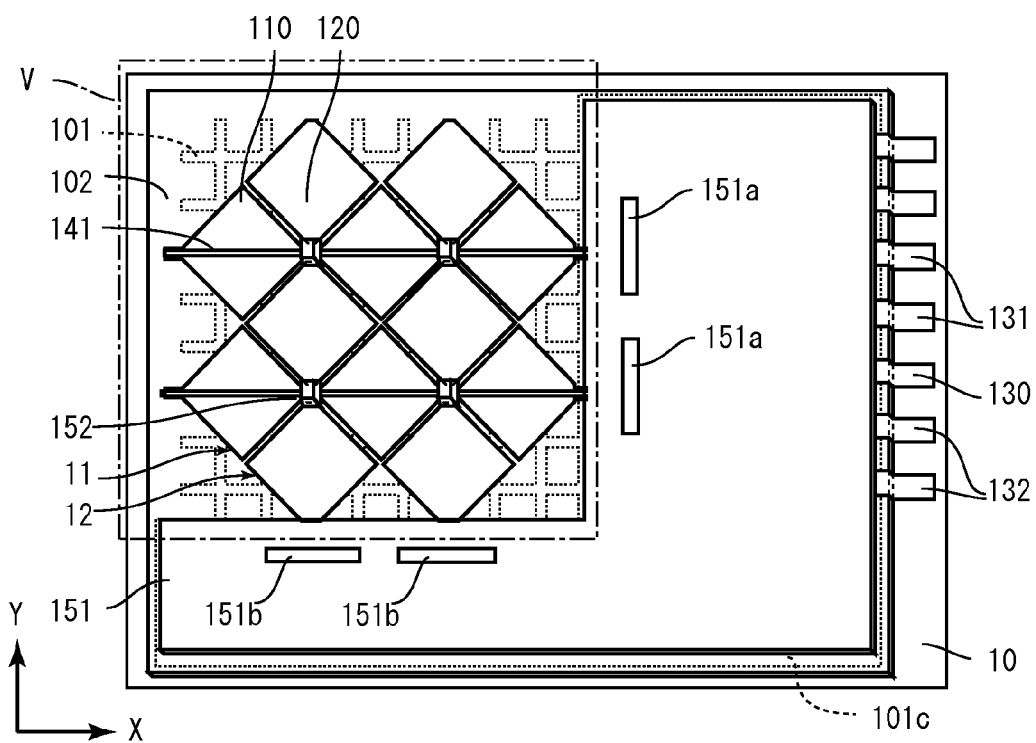
FIG. 4D is a plan view of the components of FIG. 4C as well as insulating films.

FIG. 4D is a plan view of the components of FIG. 4C as well as insulating films 151 and 152. As shown in FIG. 4D, the insulating film 151 is formed above the planarizing film 102, terminals 130 to 132 and lines 140 to 142. The insulating films 152 are formed above the planarizing film 102, X electrode sets 11 and lines 141.

The insulating film 151 overlies the third light-shielding portion 101c as in a plan view. The insulating film 151 completely covers the lines 140 and 142, and covers some portions of the terminals 130 to 132 and lines 141. The insulating film 151 protects the lines 140 to 142 from chemicals used during manufacturing processes, for example.

The insulating film 151 has contact holes 151a that allow for connection to the lines 141 and contact holes 151b that allow for connection to the lines 142.

The insulating films 152 are located at intersections of the lines 141 and lines 143, discussed below (not shown in FIG. 4D). Each insulating film 152 covers a portion of a line 141 and some portions of X electrode sets 11.

Figure 4E:
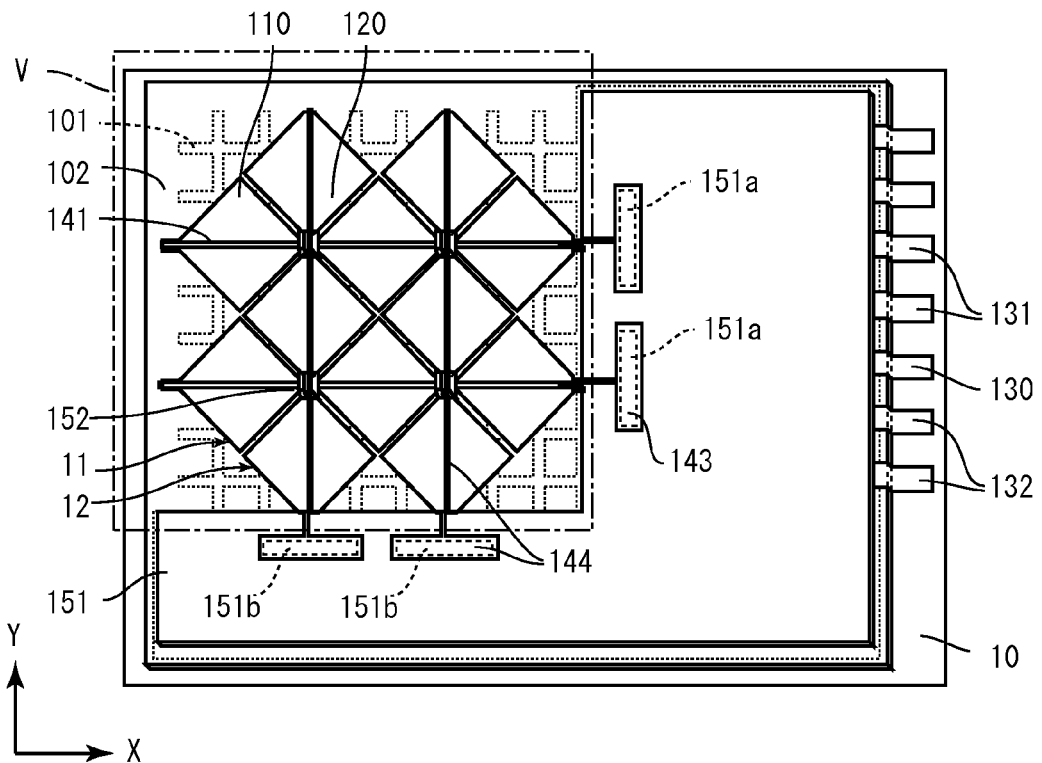
FIG. 4E is a plan view of the components of FIG. 4D as well as some other lines.

FIG. 4E is a plan view of the components of FIG. 4D as well as some other lines 143 and 144. As shown in FIG. 4E, the lines 143 are formed above the insulating film 151 and lines 141. The lines 144 are formed above the insulating films 151 and 152 and Y electrode sets 12.

Each line 143 is in contact with the corresponding line 141 via the corresponding contact hole 151a in the insulating film 151 (see the cross-sectional view taken along line E-E' in FIG. 3). In the display region V, the line further overlies a portion of the line 141. In the display region V, the line 143 overlies the corresponding first light-shielding portion 101a as in a plan view and has a smaller width than the first light-shielding portion 101a.

Each line 144 is in contact with the corresponding line 142 via the corresponding contact hole 151b in the insulating film 151 (see the cross-sectional view taken along line D-D' in FIG. 3). In the display region V, the line 144 further extends above the corresponding column of insulating films 152 to be in contact with the insular electrodes 120 of the corresponding Y electrode set 12. In the display region V, the line 144 overlies the corresponding second light-shielding portion 101b as in a plan view and has a smaller width than the second light-shielding portion 101b.

Figure 4F:
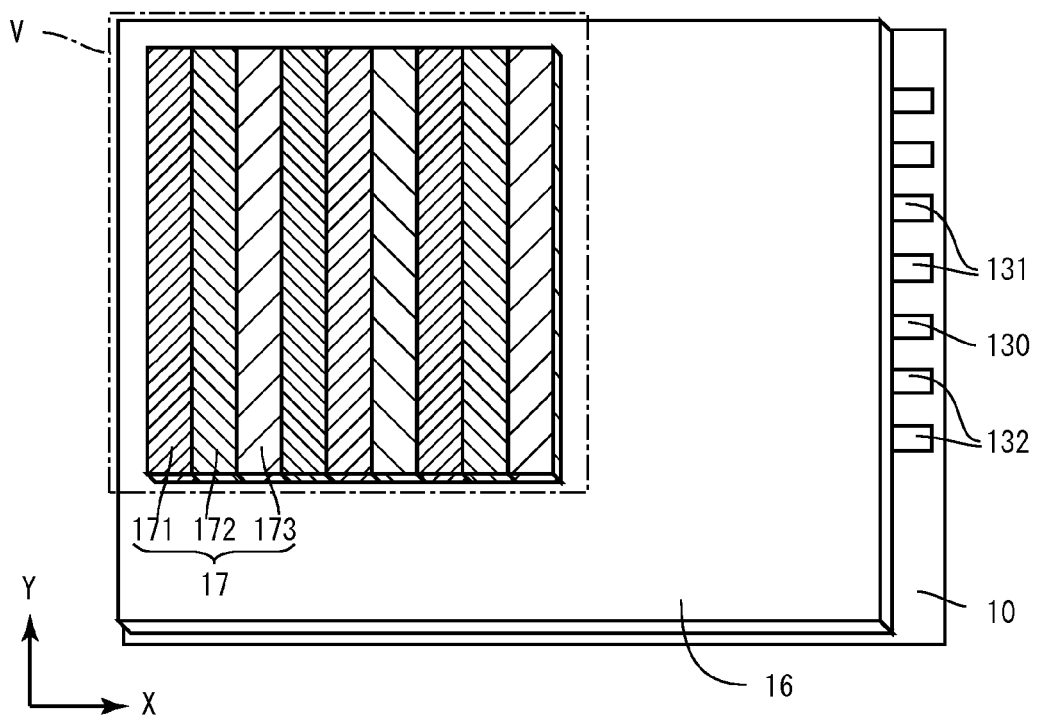
FIG. 4F is a plan view of the components of FIG. 4E as well as a protection film and a color filter.

FIG. 4F is a view of the components of FIG. 4E as well as a protection film 16 and a color filter 17. As shown in FIG. 4F, the protection film 16 is formed above the planarizing film 102, X electrode sets 11, Y electrode sets 12, terminals 130 to 132 and lines 140 to 144. The X electrode sets 11, Y electrode sets 12 and lines 140 to 144 are completely covered with the protection film 16. Some portions of the terminals 130 to 132 are covered with the protection film 16, and the other portions are not covered with the protection film 16.

The color filter 17 is provided on the planarized surface of the protection film 16 and has a constant thickness. The color filter 17 is provided in the display region V. The color filter 17 includes red color strips 171, green color strips 172 and blue color strips 173 arranged on a regular basis. The border between a red color strip 171 and a green color strip 172, the border between a green color strip 172 and a blue color strip 173 and the border between a blue color strip 173 and a red color strip 171 overlie second light-shielding portions 101b of the black matrix 101 as in a plan view.

It should be noted that the color filter 17 may have any configuration and may include other color combinations or even four or more color strips with different colors. Further, while the present embodiment illustrates red, green and blue color strips 171, 172 and 173 arranged in stripes, any arrangement may be used.

Figure 4G:
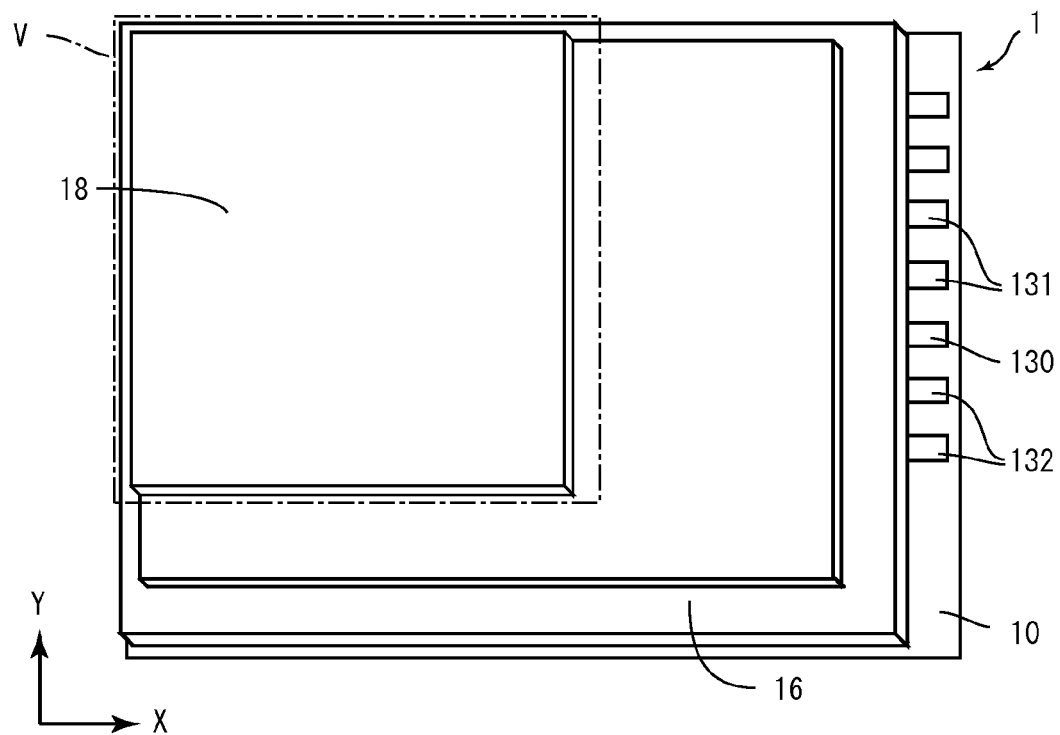
FIG. 4G is a plan view of the components of FIG. 4F as well as a common electrode, i.e. a plan view of the touch panel according to the first embodiment of the present invention.

FIG. 4G is a plan view of the components of FIG. 4F as well as a common electrode 18, i.e. a plan view of the touch panel 1. As shown in FIG. 4G, the common electrode 18 is formed substantially over the entire protective film 16 and color filter 17.

[Method of Manufacturing Touch Panel 1]

Now, a method of manufacturing a touch panel 1 will be described with reference to FIGS. 4A to 4G and FIGS. 5A to 5G. FIGS. 5A to 5G are cross-sectional views of the touch panel of FIG. 2 taken along lines A-A', B-B', C-C', D-D' and E-E'.

Figure 5A:
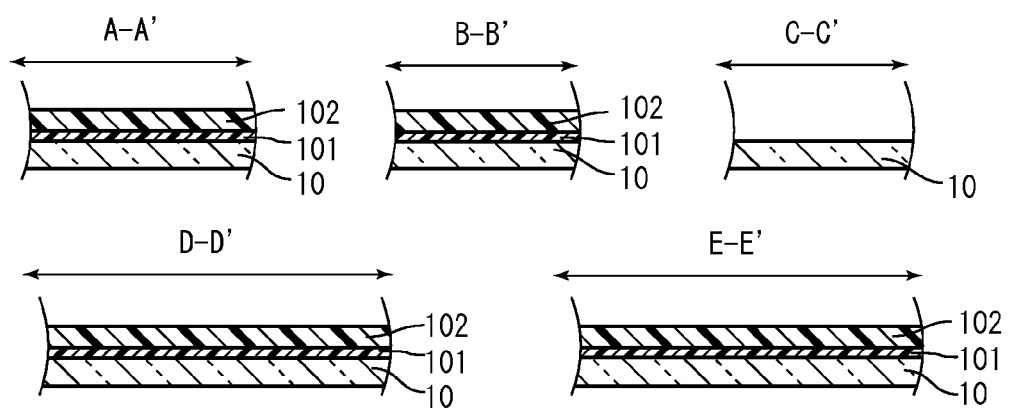
FIG. 5A shows cross-sectional views for illustrating how the touch panel according to the first embodiment of the present invention may be manufactured.

First, as shown in FIGS. 4A and 5A, a black matrix 101 and planarizing film 102 are formed over a substrate 10. The substrate 10 may be a glass substrate, for example.

The black matrix 101 may be made of a low-reflective metal such as chromium, or a black resin. A black resin may preferably be used. As discussed below, a group of sensor electrodes (X electrode sets 11 and Y electrode sets 12, for example) are formed above the black matrix 101. If the black matrix 101 is made of a black resin, it will not affect an electrostatic capacitance formed by the sensor electrodes.

The black resin may be, for example, a photoresist containing an acrylic resin, a novolak resin or the like in which a black pigment is dispersed. The photoresist may be of positive type, where the solubility in a developer decreases when the photoresist is exposed to light, or of negative type, where the solubility in a developer increases when the photoresist is exposed to light.

Black resin is evenly applied to the entire surface of the substrate 10 using a spin coater or slit coater. The black resin applied may have any thickness: for example, 0.1 to 2.0 μm. After the black resin is applied, photolithographic patterning is performed to form a black matrix 101.

Subsequently, a planarizing film 102 is formed to cover the entire black matrix 101 and a portion of the substrate 10. The planarizing film 102 may be, for example, an acrylic resin. The planarizing film 102 may be formed using a spin coater or slit coater. At this moment, a metal mask or the like is used such that the planarizing film 102 does not cover an edge of the substrate 10. The thickness of the planarizing film 102 is suitably equal to or greater than the thickness of the black matrix 101.

Figure 5B:
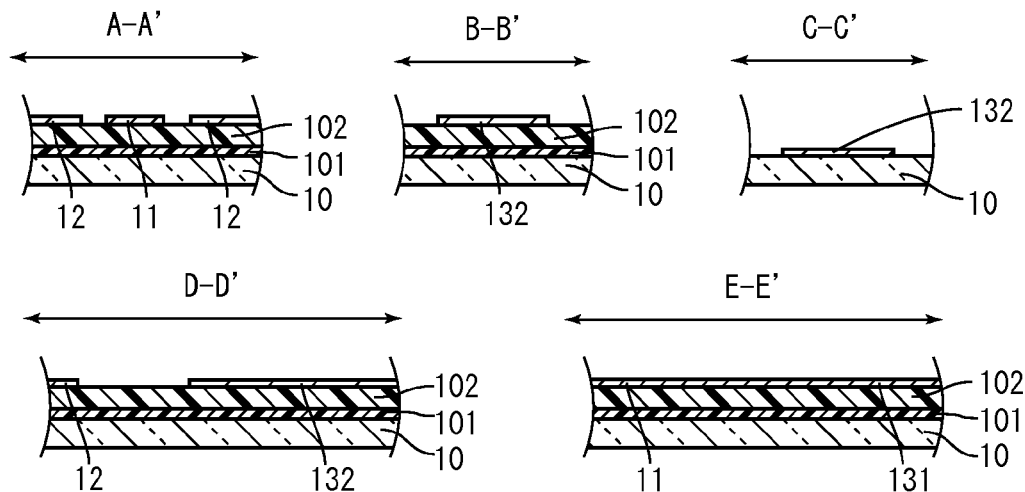
FIG. 5B shows cross-sectional views for illustrating how the touch panel according to the first embodiment of the present invention may be manufactured.

Next, as shown in FIGS. 4B and 5B, X electrode sets 11, Y electrode sets 12 and terminals 130 to 132 are formed above the substrate 10 and planarizing film 102. First, an even transparent conductive film is formed above the substrate 10 and planarizing film 102 by sputtering or chemical vapor deposition (CVD). The transparent conductive film may be, for example, ITO or IZO. The transparent conductive film may have any thickness: for example, 10 to 50 nm.

The transparent conductive film above the substrate 10 and planarizing film 102 is patterned photolithographically. More specifically, a mask of a photoresist is formed in the geometry in which X electrode sets 11, Y electrode sets 12 and terminals 130 to 132 are to be formed. Then, the uncovered portions are etched away. Any etching technique may be used: for example, oxalic acid or a mixture of phosphoric acid/acetic acid/nitric acid may be used.

Upon completion of the patterning, annealing is performed at a temperature in the range of 200 to 250° C. This annealing renders the amorphous transparent conductive film (X electrode sets 11, Y electrode sets 12 and terminals 130 to 132) polycrystalline.

Figure 5C:
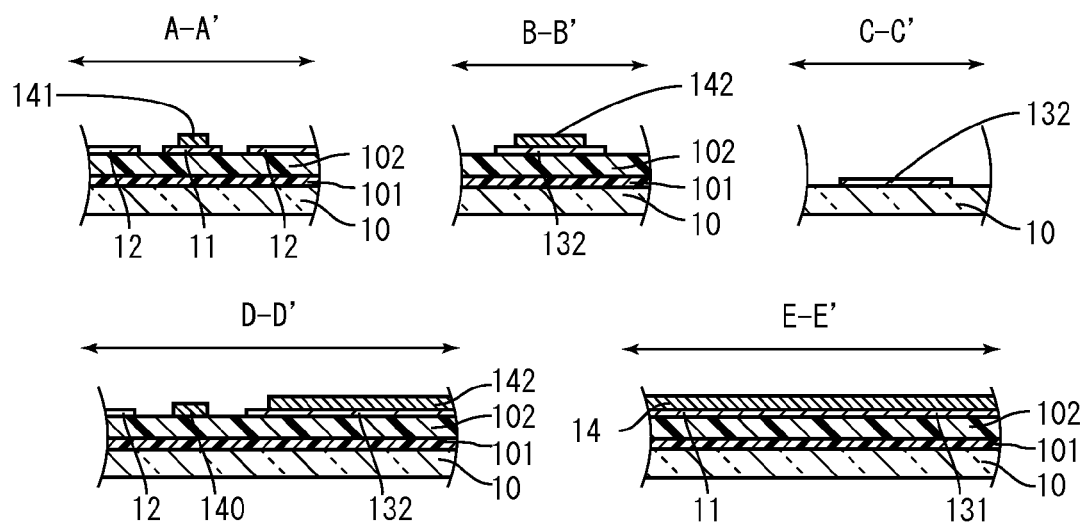
FIG. 5C shows cross-sectional views for illustrating how the touch panel according to the first embodiment of the present invention may be manufactured.

Next, as shown in FIGS. 4C and 5C, lines 140 to 142 are formed. First, a metal film is formed by sputtering or vapor deposition to completely cover the substrate 10, planarizing film 102, X electrode sets 11, Y electrode sets 12 and terminals 130 to 132. The metal film may be made of, for example, a low-resistant metal such as aluminum. Preferably, the metal film is a lamination of a plurality of metals to improve the adhesiveness to a lower or upper layer and the corrosion resistance. For example, a film structure of MoNb, Al and MoNb, obtained by depositing them in this order, may be used. The metal film may have any thickness: for example, 0.3 to 1.0 μm.

The metal film formed over the entire surface of the substrate 10 is patterned photolithographically. More specifically, a mask of a photoresist is formed in the geometry in which lines 140 to 142 are to be formed. Then, the uncovered portions are etched away. Any etching technique may be used: for example, a mixture of phosphoric acid/acetic acid/nitric acid may be used.

Figure 5D:
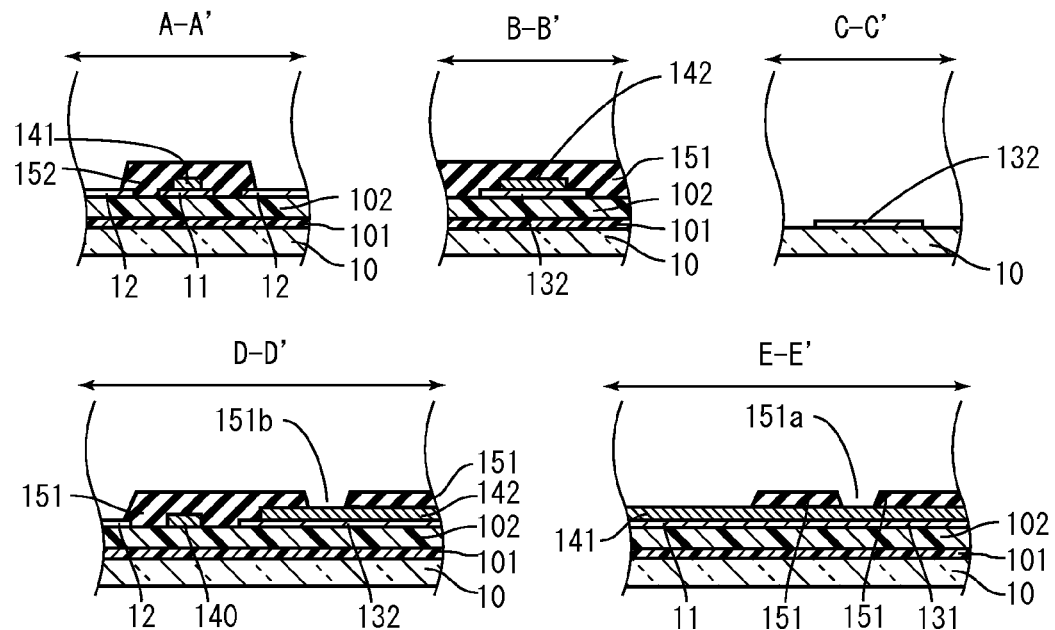
FIG. 5D shows cross-sectional views for illustrating how the touch panel according to the first embodiment of the present invention may be manufactured.

Next, as shown in FIGS. 4D and 5D, insulating films 151 and 152 are formed. The insulating films 151 and 152 may be made of an organic or inorganic insulator.

An implementation will be described where the insulating films 151 and 152 are made of an organic insulator. The organic insulator may be, for example, a photoresist containing an acrylic resin, novolak resin or the like. Photoresist is evenly applied to the entire surface of the substrate 10 using a spin coater or slit coater. The insulating film 151 is provided to protect the lines 140 to 142 and other components, as discussed above, and preferably has a relatively large thickness. The photoresist may have any thickness: for example, 1.5 to 3.0 μm.

The photoresist formed over the entire surface of the substrate 10 is patterned photolithographically to form the insulating films 151 and 152. At the same time, contact holes 151*a* and 151*b* are also formed.

An implementation will be described where the insulating films 151 and 152 are made of an inorganic insulator. The inorganic insulator may be, for example, SiN, $SiO_2$, SiON or the like. An even inorganic film made of one of these substances is formed by CVD on the entire surface of the substrate 10. Again, preferably, the inorganic film has a relatively large thickness, and preferably has a thickness twice the thickness of the lines 140 to 142 or greater.

The inorganic film formed over the entire surface of the substrate 10 is patterned photolithographically. More specifically, a mask of a photoresist is formed in the geometry in which insulating films 151 and 152 are to be formed. Then, the uncovered portions are etched away. At the same time, contact holes 151*a* and 151*b* are also formed. Any etching technique may be used: for example, dry etching using a fluorine-based gas may be used.

Figure 5E:
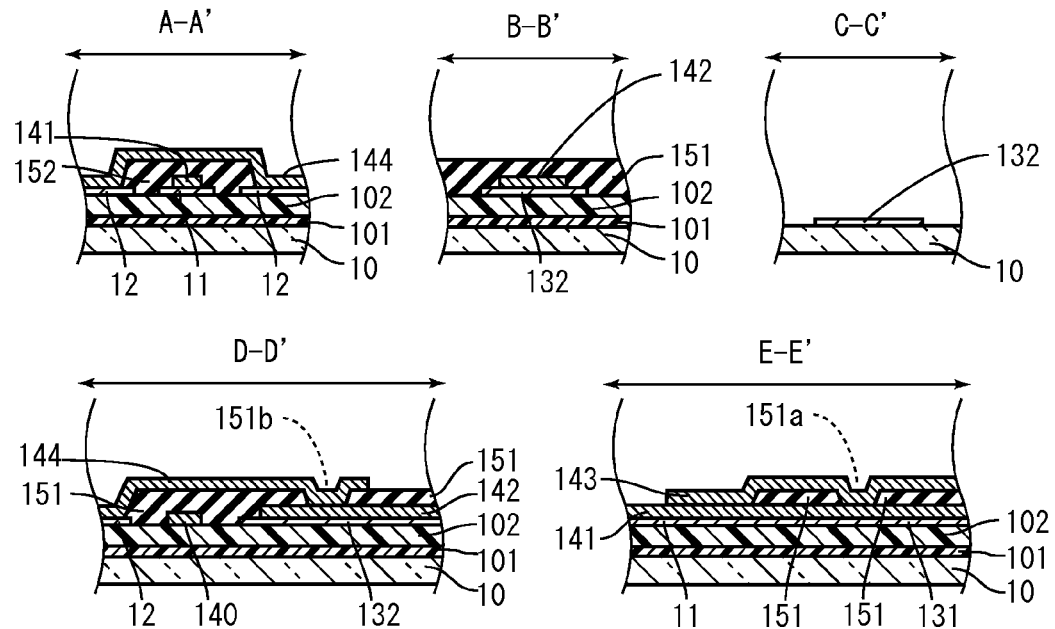
FIG. 5E shows cross-sectional views for illustrating how the touch panel according to the first embodiment of the present invention may be manufactured.

Next, as shown in FIGS. 4E and 5E, lines 143 and 144 are formed. First, a metal film is formed by sputtering or vapor deposition to completely cover the substrate 10, planarizing film 102, X electrode sets 11, Y electrode sets 12, terminals 130 to 132, lines 141, and insulating films 151 and 152. The metal film may be made of the same material as that used to form the lines 140 to 142, or may be made of a different material. The metal film may be, for example, a film structure of MoNb, Al and MoNb, obtained by depositing them in this order. The metal film may have any thickness: for example, 0.3 to 1.0 μm.

The metal film formed over the entire surface of the substrate 10 is patterned photolithographically. More specifically, a mask of a photoresist is formed in the geometry in which lines 143 and 144 are to be formed. Then, the uncovered portions are etched away. Any etching technique may be used: for example, a mixture of phosphoric acid/acetic acid/nitric acid may be used. During this step, the etching time is adjusted such that the lines 141 are not etched away.

Figure 5F:
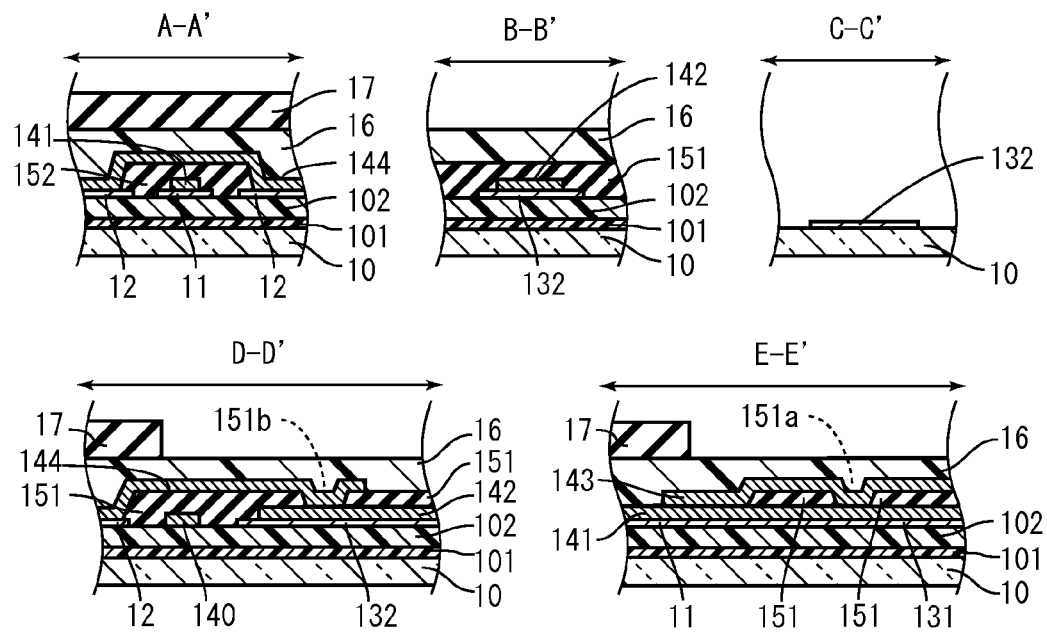
FIG. 5F shows cross-sectional views for illustrating how the touch panel according to the first embodiment of the present invention may be manufactured.

Next, as shown in FIGS. 4F and 5F, a protection film 16 and a color filter 17 are formed.

The protection film 16 is formed to cover substantially the entire surface of the substrate 10. The protection film 16 may be, for example, an acrylic resin. Alternatively, the protection film 16 may be an inorganic film of SiN, $SiO_2$, SiON or the like on which a film of an acrylic resin or the like is deposited. The inorganic film may be formed by CVD, for example. The film of an acrylic resin or the like may be formed using a spin coater or slit coater, for example. During this step, a metal mask or the like is used such that the protective film 16 does not cover an edge of the substrate 10 and some portions of the terminals 130 to 132 are not covered. The protection film 16 may have any thickness: for example, 1.5 to 3.0 μm.

Subsequently, a color filter 17 is formed above the protection film 16. The color filter 17 may be a coloring material having a resin or the like in which a pigment or dyestuff is dispersed or dissolved. The color filter 17 may be formed by, for example, repeating photolithographic patterning. More specifically, first, a red coloring material is evenly applied to the protection film 16 using a slit coater, spin coater or the like. Thereafter, patterning is performed to form a red color strip 171. Then, this step is repeated to form a green color strip 172 and a blue color strip 173.

The color filter 17 may also be formed by ink-jet techniques. More specifically, first, a mixed composite of a red coloring material and a solvent or the like is applied to a predetermined location of the protection film 16 by ink-jet printing. Thereafter, the solvent is dried, set, fired and otherwise treated to form a red color strip 171. Then, this step is repeated to form a green color strip 172 and a blue color strip 173.

Figure 5G:
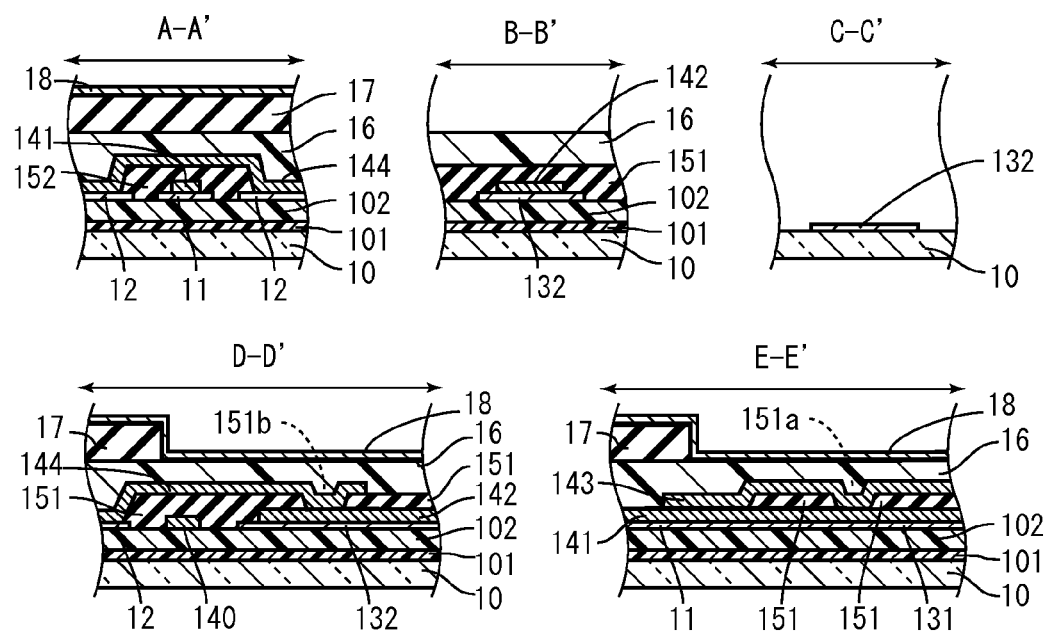
FIG. 5G shows cross-sectional views for illustrating how the touch panel according to the first embodiment of the present invention may be manufactured.

Lastly, as shown in FIGS. 4G and 5G, a common electrode 18 is formed. The common electrode 18 may be, for example, a transparent conductive film of ITO, IZO or the like. An even common electrode 18 is formed by sputtering or CVD substantially over the entire surface of the substrate 10 to cover the protection film 16 and color filter 17. During this step, a metal mask or the like is used such that the common electrode 18 does not cover an edge of the substrate 10 so as not to be in contact with the terminals 130 to 132 and other components. The common electrode 18 may have any thickness: for example, 10 to 50 nm.

A construction of the touch panel 1 according to the first embodiment of the present invention and a method of manufacturing the same have been described.

In the touch panel 1 of the present embodiment, each of the lines 141 is in contact with the insular electrodes 110 of the corresponding X electrode set 11. Further, each of the lines 144 is in contact with the insular electrodes 120 of the corresponding Y electrode set 12. This will increase the conductivity of the X and Y electrode sets 11 and 12, thereby improving sensitivity.

In the display region V, each line 141 overlies the corresponding first light-shielding portion 101a of the black matrix 101 as in a plan view, and has a smaller width than the first light-shielding portion 101a. In the display region V, each line 144 overlies the corresponding second light-shielding portion 101b of the black matrix 101 as in a plan view, and has a smaller width than the second light-shielding portion 101b. This will prevent the lines 141 and 144 from being visible to the viewer. Neither will it decrease the aperture ratio of the display device 8.

According to the present embodiment, as shown in FIG. 4B, the insular electrodes 110 constituting an X electrode set 11 and a terminal 131 are formed continuously and integrally. That is, the X electrode set 11 and terminal 131 are electrically connected by themselves. In addition, the insular electrodes 110 and terminal 131 are electrically connected via a line 141. Further, a line 143 overlies a portion of the line 141. This redundant construction will reduce resistance while increasing the reliability of the lines and improving yield.

According to the present embodiment, as shown in FIG. 4C, outside the display region V, i.e. in the peripheral region, the lines 141 and 142 overlie the extending portions 131a and 132a of the terminals 131 and 132. This redundant construction will reduce resistance as well as increase the reliability of the lines and improving yield.

According to the present embodiment, the X electrode sets 11, Y electrode sets 12 and terminals 130 to 132 are formed of the same material during the same step. Further, in the display region V and outside the display region V i.e. in the peripheral region, the lines 141 are formed of the same material during the same step as the lines 140 and 142. Thus, the present embodiment will reduce the number of times patterning is performed, simplifying the manufacturing process.

Second Embodiment

The touch panel equipped display device 8 may include, in lieu of the touch panel 1, any one of the touch panels 2 to 6 described below.

Figure 6:
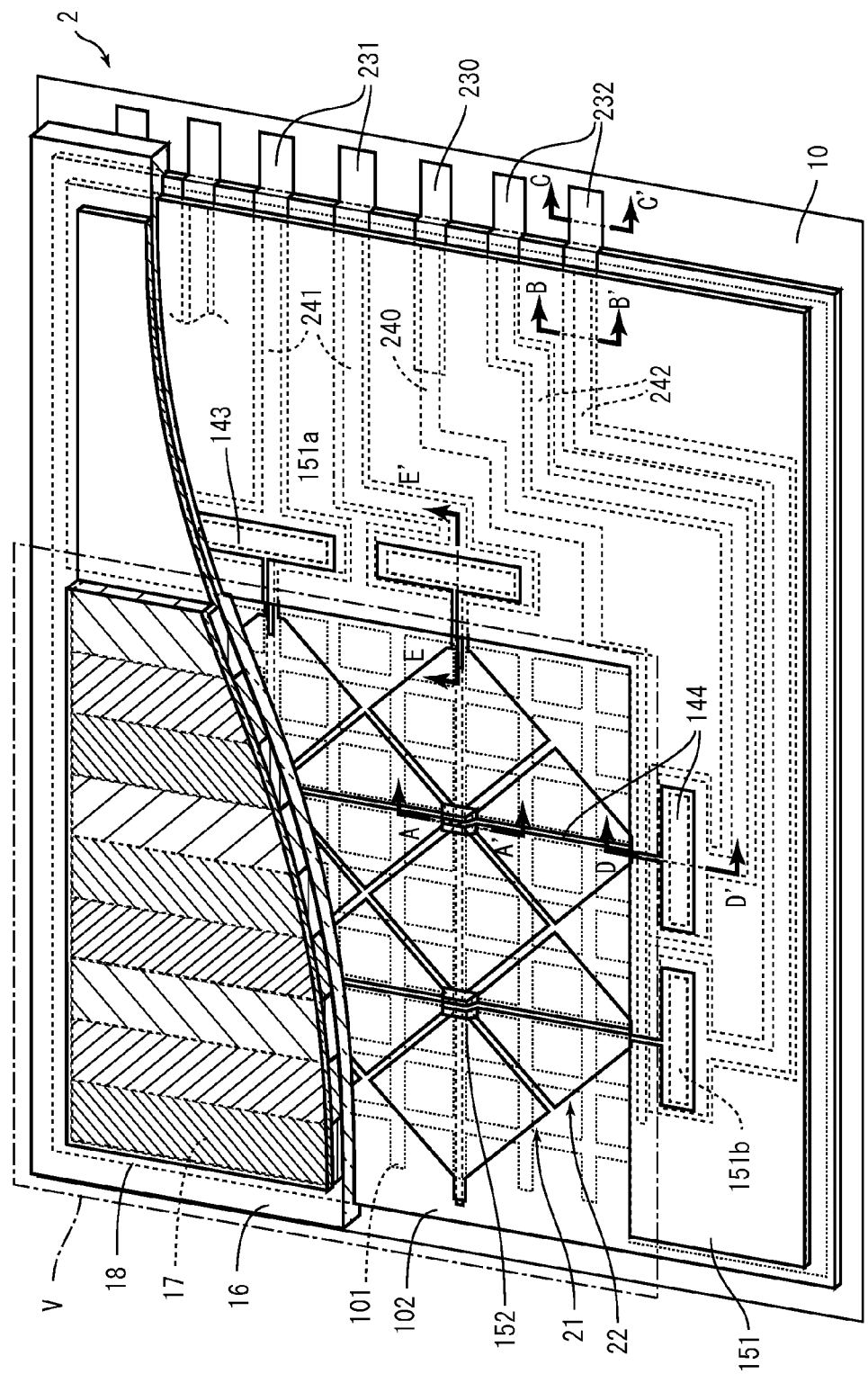
FIG. 6 is a schematic partially cut-away view of a touch panel according to a second embodiment of the present invention.
Figure 7:
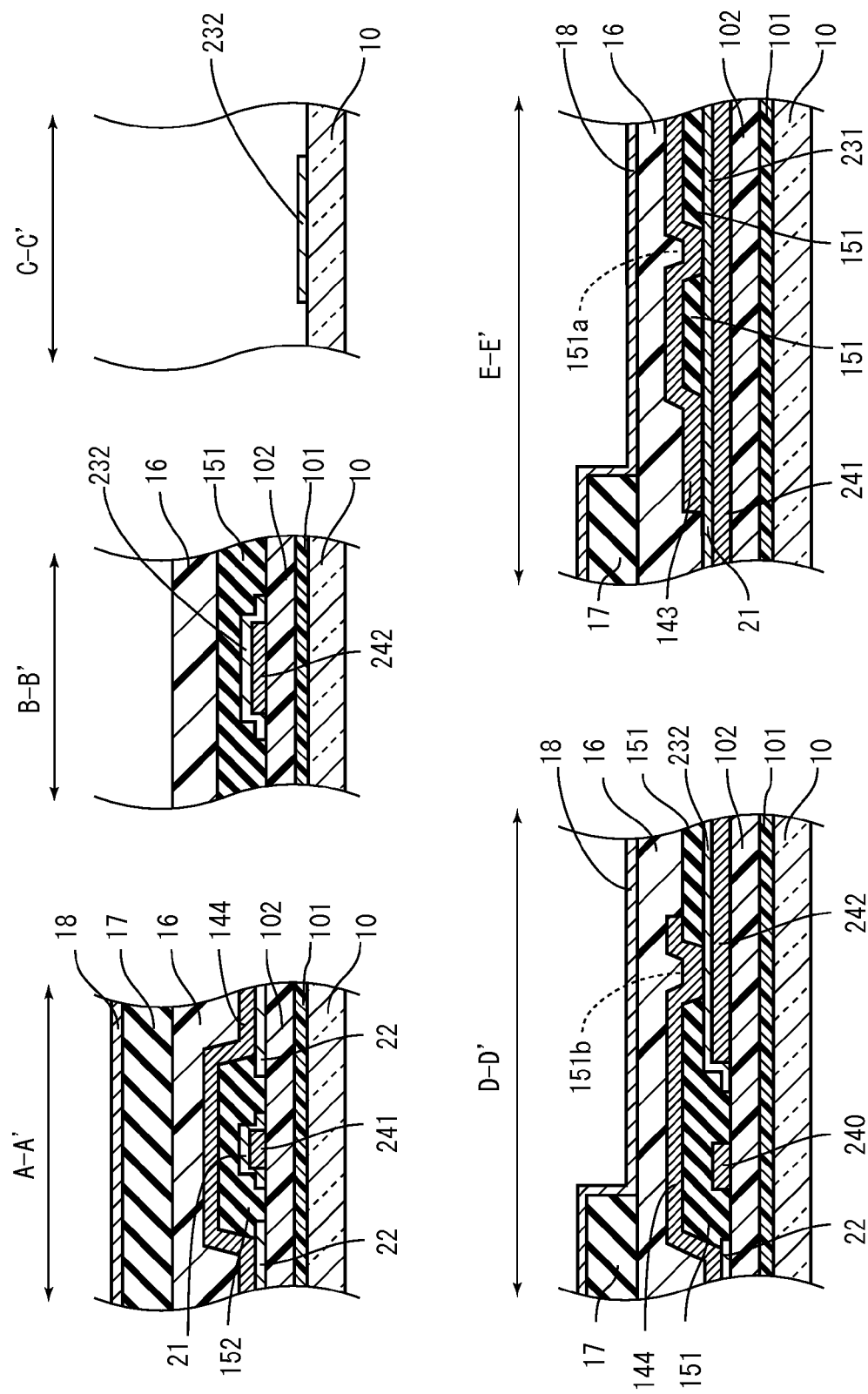
FIG. 7 shows cross-sectional views of the touch panel of FIG. 6 taken along lines A-A', B-B', C-C', D-D' and E-E'.

FIG. 6 is a schematic partially cut-away view of a touch panel 2 according to a second embodiment of the present invention. FIG. 7 shows cross-sectional views of the touch panel of FIG. 6 taken along lines A-A', B-B', C-C', D-D' and E-E'. The touch panel 2 includes a substrate 10, a black matrix 101, a planarizing film 102, X electrode sets 21, Y electrode sets 22, terminals 230 to 232, lines 143, 144 and 240 to 242, insulating films 151 and 152, a protection film 16, a color filter 17 and a common electrode 18.

The touch panel 2 is different from the touch panel 1 in terms of the arrangement of the X electrode sets, Y electrode sets, terminals and lines. In the touch panel 2, the lines 240 to 242 are located lower than the X electrode sets 21, Y electrode sets 22 and terminals 230 to 232.

More specifically, to make a touch panel 1, X electrode sets 11 and Y electrode sets 12 and terminals 130 to 132 are first formed on the planarizing film 102 (see FIG. 4B); then, lines 140 and 142 are formed thereon (see FIG. 4C). On the other hand, to make a touch panel 2, lines 240 to 242 are first formed and, thereafter, X electrode sets 21, Y electrode sets 22 and terminals 230 to 232 are formed.

The present embodiment provides a variation of touch panel configuration.

Third Embodiment

Figure 8:
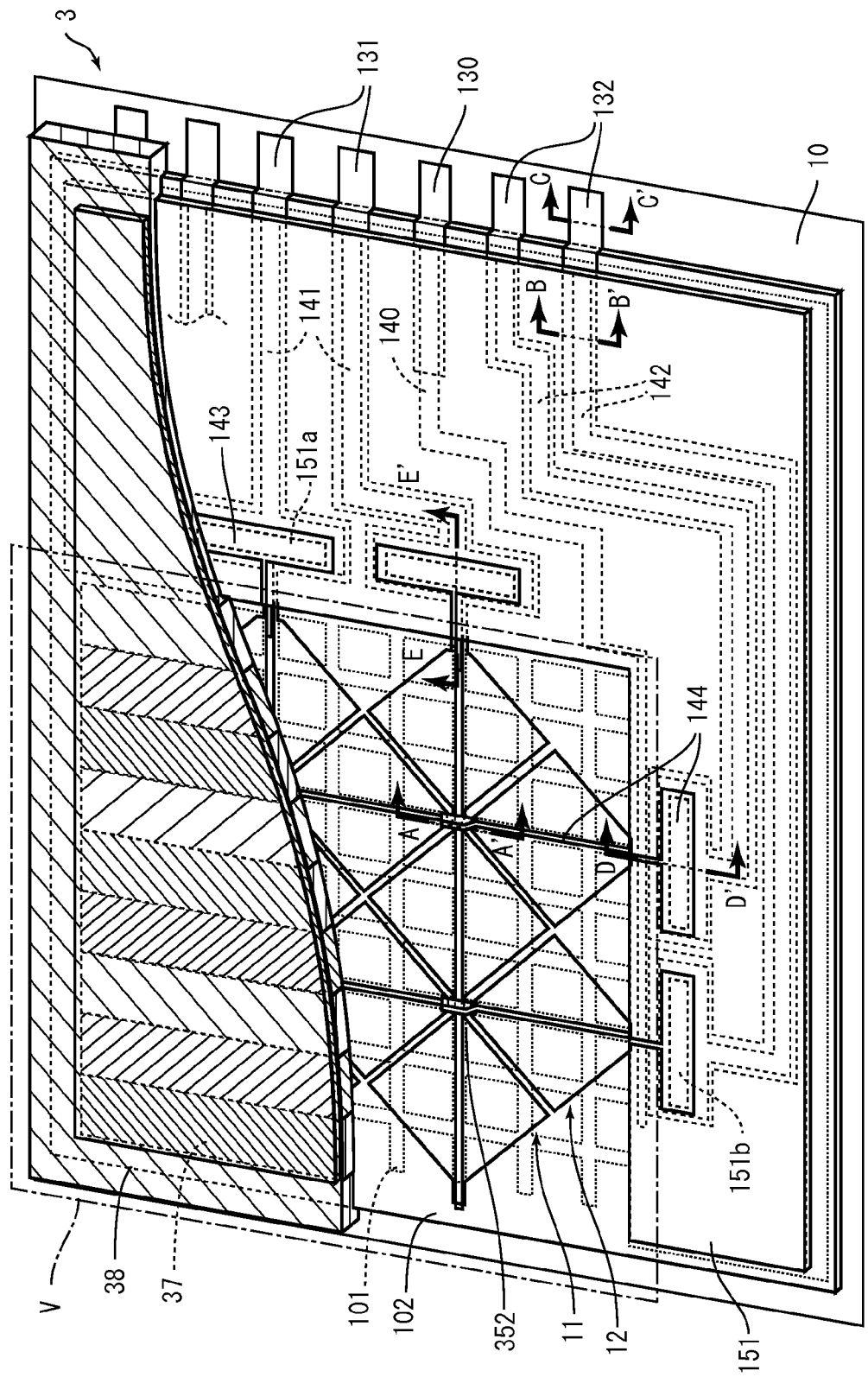
FIG. 8 is a schematic partially cut-away view of a touch panel according to a third embodiment of the present invention.
Figure 9:
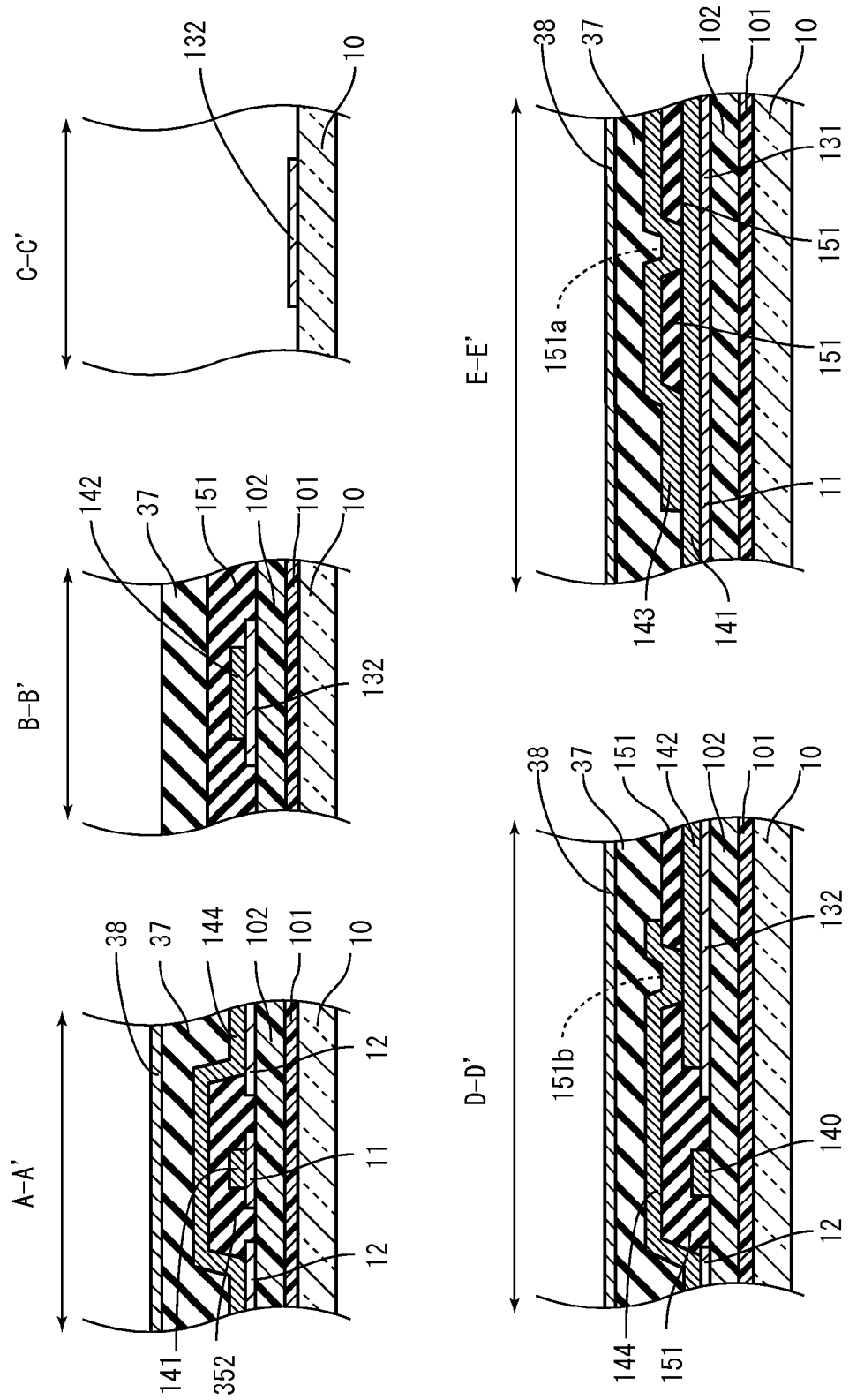
FIG. 9 shows cross-sectional views of the touch panel of FIG. 8 taken along lines A-A', B-B', C-C', D-D' and E-E'.

FIG. 8 is a schematic partially cut-away view of a touch panel 3 according to a third embodiment of the present invention. FIG. 9 shows cross-sectional views of the touch panel of FIG. 8 taken along lines A-A', B-B', C-C', D-D' and E-E'. The touch panel 3 includes a substrate 10, a black matrix 101, a planarizing film 102, X electrode sets 11, Y electrode sets 12, terminals 130 to 132, lines 140 to 144, insulating films 151 and 352, a color filter 37 and a common electrode 38.

The touch panel 3 is different from the touch panel 1 in terms of the arrangement of the insulating films, color filter and common electrode; further, the touch panel 3 does not include a component that would correspond to the protection film 16 of the touch panel 1.

In the touch panel 3, the protection film 16 of the touch panel 1 is replaced by a color filter 37 provided substantially over the entire surface of the substrate 10. A common electrode 38 is provided over the color filter 37. That is, in the touch panel 3, the color filter 37 also serves as a protection film.

The thickness of the color filter 37 is not even due to the thicknesses of the insulating films 352, lines 141 and 144 and other components located directly below the color filter 37. More specifically, the portions of the color filter 37 that have thick layers directly below have smaller thicknesses. The portions of the color filter 37 that have smaller thicknesses have smaller color saturations. In other words, uneven thicknesses of the color filter 37 lead to uneven tones displayed.

In the touch panel 3, an insulating film 352 overlies a second light-shielding portion 101b of the black matrix 101 as in a plan view, and has a small width than the second light-shielding portion 101b. Further, similar to the touch panel 1, in the display region V, each line 141 overlies the corresponding first light-shielding portion 101a of the black matrix 101 as in a plan view, and has a smaller width than the first light-shielding portion 101a. In the display region V, each line 144 overlies the corresponding second light-shielding portion 101b of the black matrix 101 as in a plan view, and has a smaller width than the second light-shielding portion 101b.

As such, the portions of the color filter 37 that have smaller thicknesses due to the lines 141 and 144 and insulating films 352 are shielded by the black matrix 101, and thus are not visible to the viewer.

According to the present embodiment, forming of a protection film 16 in a touch panel 1 is omitted. This will reduce the number of manufacturing steps, improving yield.

The present embodiment illustrates an arrangement where insulating films 352 are shielded by second light-shielding portions 101b of the black matrix 101. Alternatively, insulating films 352 may be shielded by first light-shielding portions 101a. More specifically, an insulating film 352 may overlie a first light-shielding portion 101a as in a plan view and have a smaller width than the first light-shielding portion 101a.

Fourth Embodiment

Figure 10:
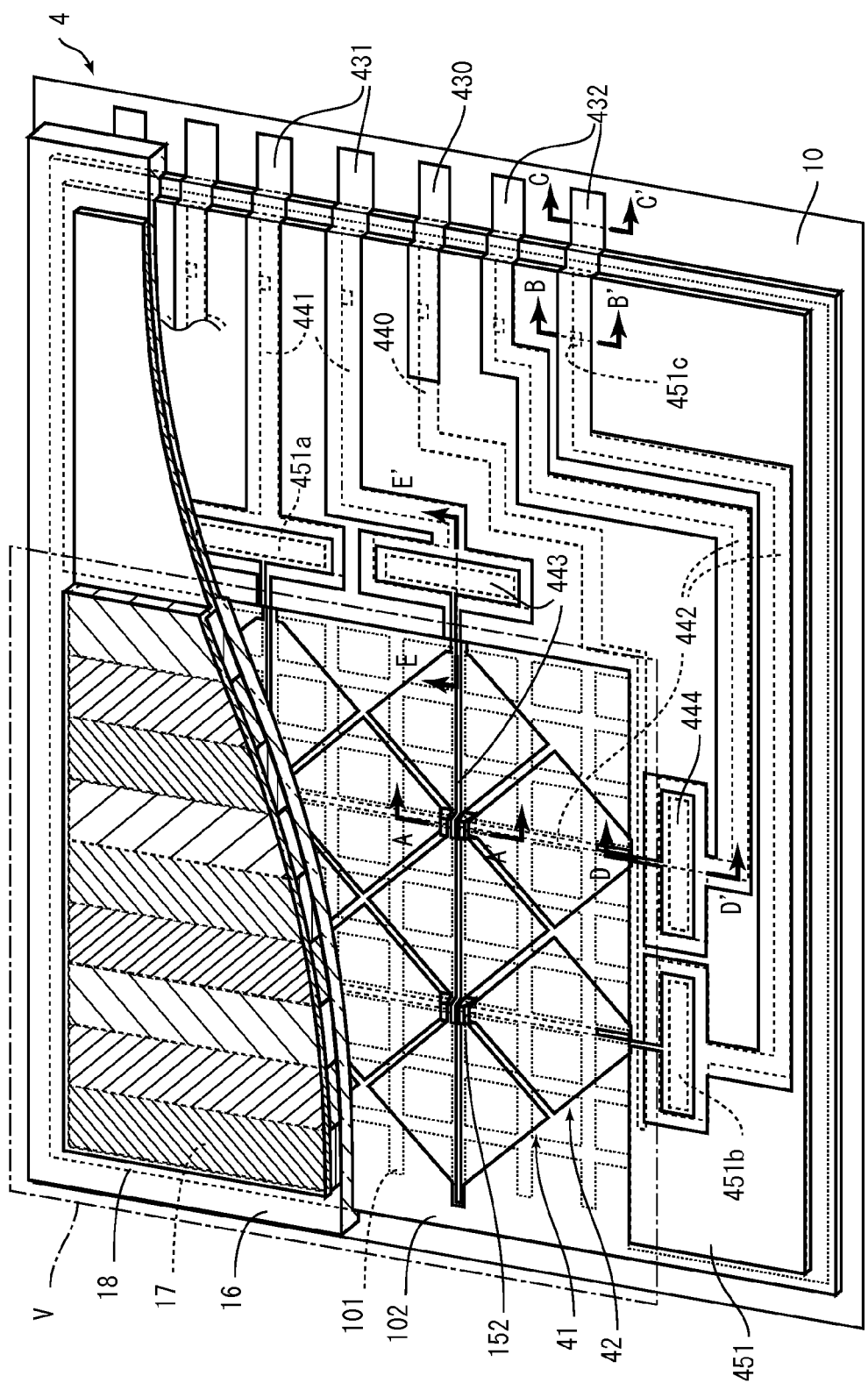
FIG. 10 is a schematic partially cut-away view of a touch panel according to a fourth embodiment of the present invention.
Figure 11:
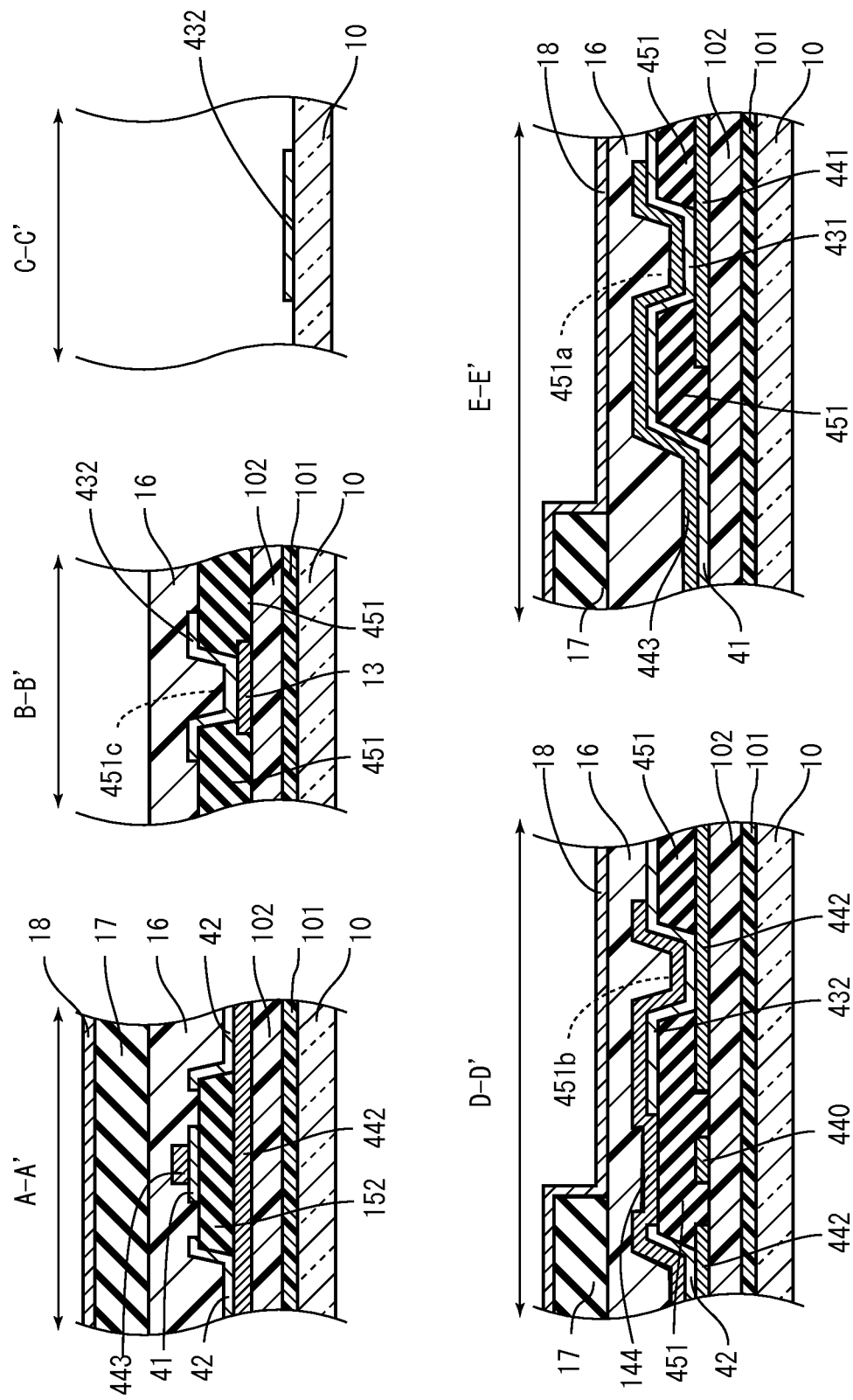
FIG. 11 shows cross-sectional views of the touch panel of FIG. 10 taken along lines A-A', B-B', C-C', D-D' and E-E'.

FIG. 10 is a schematic partially cut-away view of a touch panel 4 according to a fourth embodiment of the present invention. FIG. 11 shows cross-sectional views of the touch panel of FIG. 10 taken along lines A-A', B-B', C-C', D-D' and E-E'. The touch panel 4 includes a substrate 10, a black matrix 101, a planarizing film 102, X electrode sets 41, Y electrode sets 42, terminals 430 to 432, lines 440 to 444, insulating films 152 and 451, a protection film 16, a color filter 17 and a common electrode 18.

The touch panel 4 is different from the touch panel 1 in terms of the arrangement of the X electrode sets, Y electrode sets, terminals, lines and insulating films.

In the touch panel 1, X electrode sets 11, Y electrode sets 12 and terminals 130 to 132 are formed on the planarizing film 102 (see FIG. 4B), and lines 140 to 142 are formed thereon (see FIG. 4C). Then, insulating films 151 and 152 are formed thereon (see FIG. 4D), and lines 143 and 144 are formed thereon (see FIG. 4E). On the other hand, in the touch panel 4, insulating films are formed and, thereafter, X electrode sets, Y electrode sets and terminals are formed.

Figure 12A:
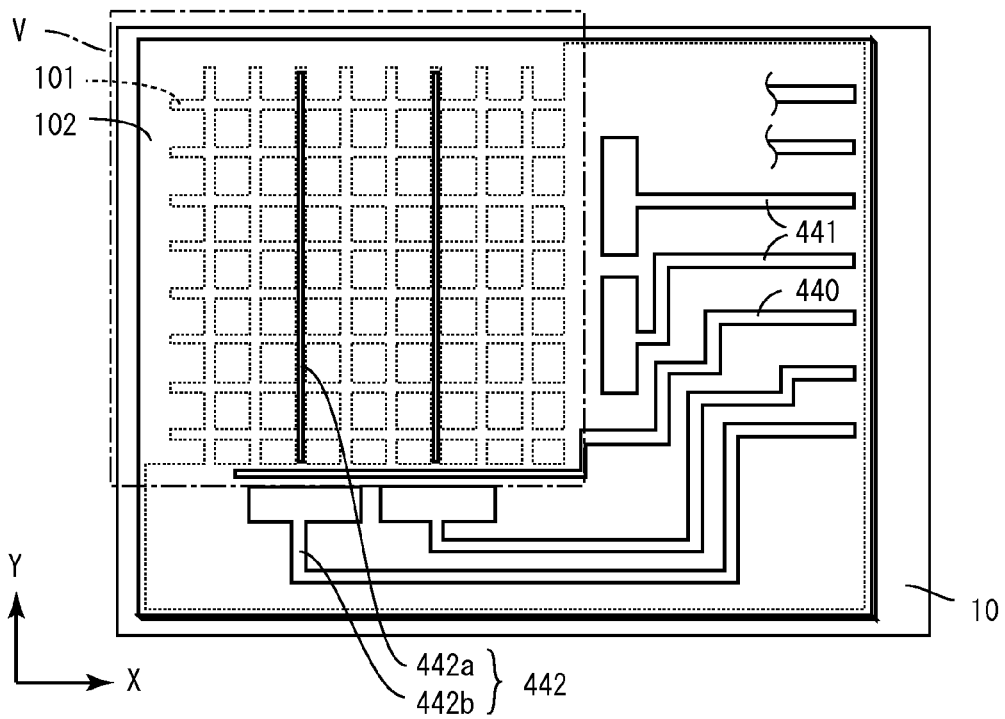
FIG. 12A is a plan view of the substrate, black matrix, planarizing film and some lines of the touch panel according to the fourth embodiment of the present invention.

First, as shown in FIG. 12A, lines 440 to 442 are formed on the planarizing film 102. Similar to the line 140 of the touch panel 1, the line 440 is a shield line for blocking electromagnetic noise. Unlike the lines 141 of the touch panel 1, no portions of the lines 441 are present in the display region V. On the other hand, in the display region V, each line set 442 overlies the corresponding second light-shielding portion 101b of the black matrix 101, and has a smaller width than the second light-shielding portion 101b. The portion of the line set 442 that is located in the display region V (referred to as line 442a) is not connected with the portion of the line set 442 that is located outside the display region V, i.e. in the peripheral region (referred to as line 442b).

Figure 12B:
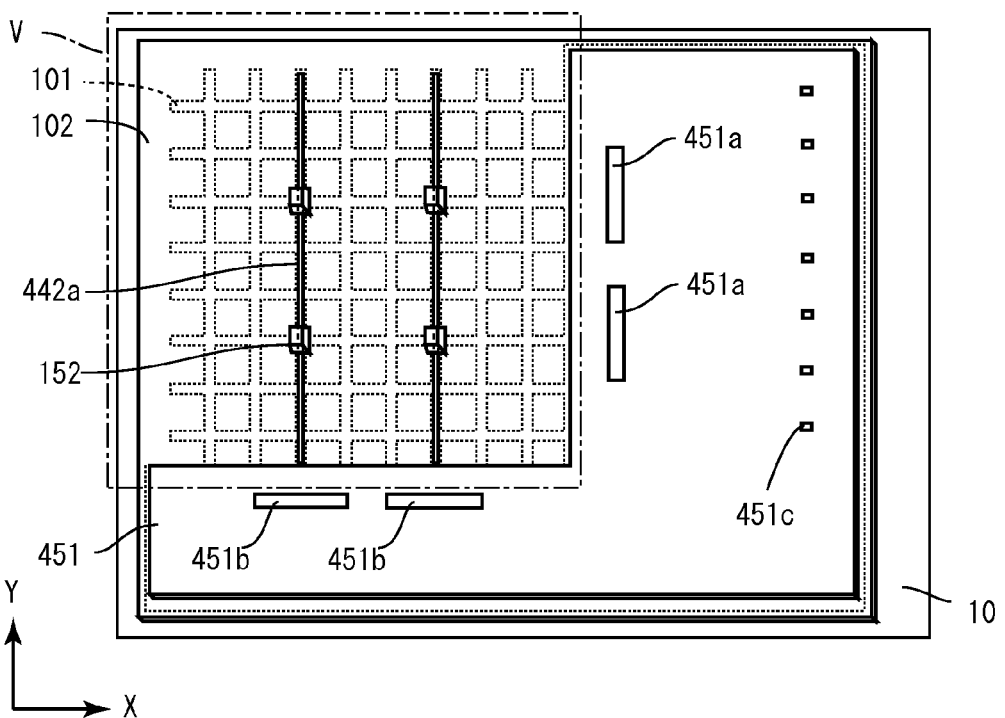
FIG. 12B is a plan view of the components of FIG. 12A as well as insulating films.

Next, as shown in FIG. 12B, an insulating film 451 is formed to cover the planarizing film 102 and lines 440 to 442. The insulating film 451 has contact holes 451a to 451c formed therein. Further, insulating films 152 are formed to cover some portions of the lines 442a.

Figure 12C:
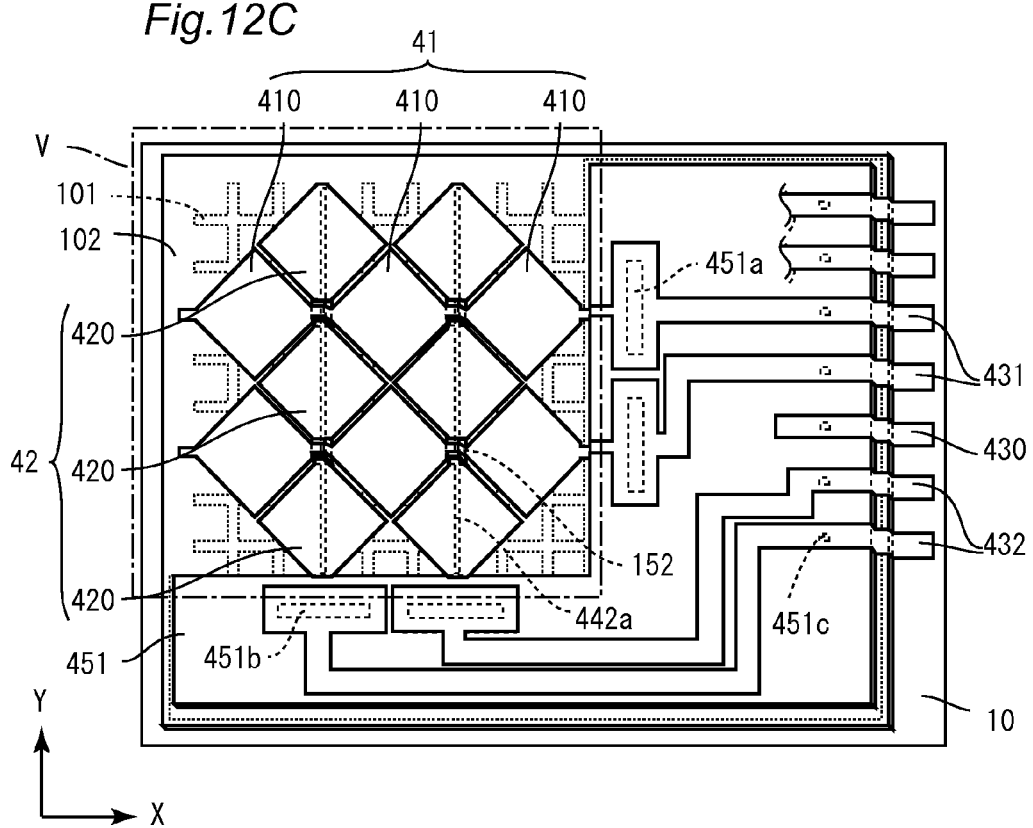
FIG. 12C is a plan view of the components of FIG. 12B as well as X electrode sets, Y electrode sets and terminals.

Next, as shown in FIG. 12C, X electrode sets 41, Y electrode sets 42 and terminals 430 to 432 are formed.

Similar to the X electrode sets 11 of the touch panel 1, each X electrode set 41 includes a plurality of insular electrodes 410 arranged in an X direction. Each Y electrode set 12 includes a plurality of insular electrodes 420 arranged in a Y direction. The insular electrodes 410 are interconnected in an X direction. On the other hand, the insular electrodes 420 are separated from each other.

The insular electrodes 420 of each column, arranged in a Y direction, are electrically connected with each other via the corresponding line 442a. An X electrode set 41 is insulated from the lines 442a by the respective insulating film 152.

Similar to the touch panel 1, an X electrode set 41 and a terminal 431 are formed continuously and integrally. On the other hand, a Y electrode set 42 is not connected with a terminal 432.

Each terminal 431 is electrically connected with the corresponding line 441 via the corresponding contact holes 451a and 451c. Similarly, each terminal 432 is electrically connected with the corresponding line 442b via the corresponding contact holes 451b and 451c. The terminal 430 is electrically connected with the line 440 via the corresponding contact hole 451c.

Figure 12D:
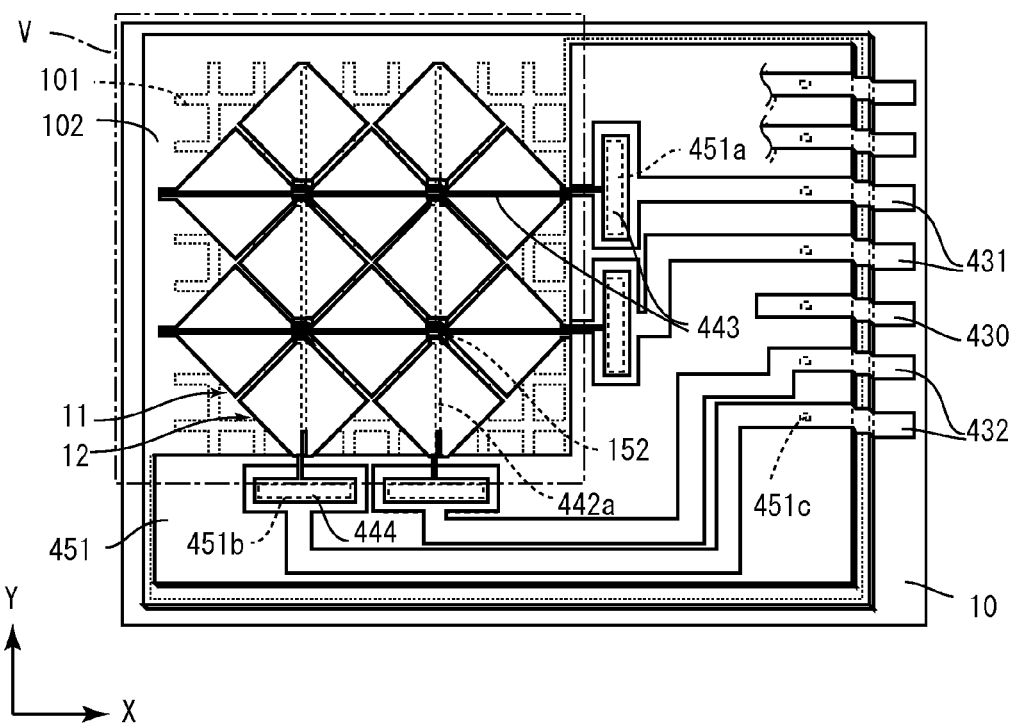
FIG. 12D is a plan view of the components of FIG. 12C as well as some other lines.

Next, as shown in FIG. 12D, lines 443 and 444 are formed.

Each line 443 overlies a portion of the corresponding terminal 431. The line 443 is in contact with the insular electrodes 410 of the corresponding X electrode set 41. In the display region V, the line 443 overlies the corresponding first light-shielding portion 101a of the black matrix 101 as in a plan view, and has a smaller width than the first light-shielding portion 101a.

Each line 444 overlies a portion of the corresponding terminal 432 and the corresponding Y electrode set 42, and is electrically connected with the terminal 432 and Y electrode set 42.

In the touch panel 4 according to the present embodiment, each of the lines 442a is in contact with the insular electrodes 420 of the corresponding Y electrode set 42. Further, each of the lines 443 is in contact with the insular electrodes 410 of the corresponding X electrode set 41. This will increase the conductivity of the X and Y electrode sets 41 and 42, thereby improving sensitivity.

Similar to the touch panel 1, the lines 442 and 443 are shielded by the black matrix 101 and thus are not visible to the viewer, and do not decrease the aperture ratio of the display device 8.

A plurality of insular electrodes 410 and a terminal 431 are formed continuously and integrally. In addition, they are electrically connected with each other via lines 141 and 143. This redundant construction will reduce the resistance while increasing the reliability of the lines, improving yield.

Outside the display region V, i.e. in the peripheral region, a terminal 431 and a line 441 provide a redundant construction. Similarly, a terminal 432 and a line 442b provide a redundant construction. This will reduce resistance while increasing the reliability of the lines, improving yield.

According to the present embodiment, similar to the touch panel 1, lines 430, 431, 432a and 432b are formed of the same material during the same step. This will reduce the number of times patterning is performed, simplifying the manufacturing process.

Fifth Embodiment

Figure 13:
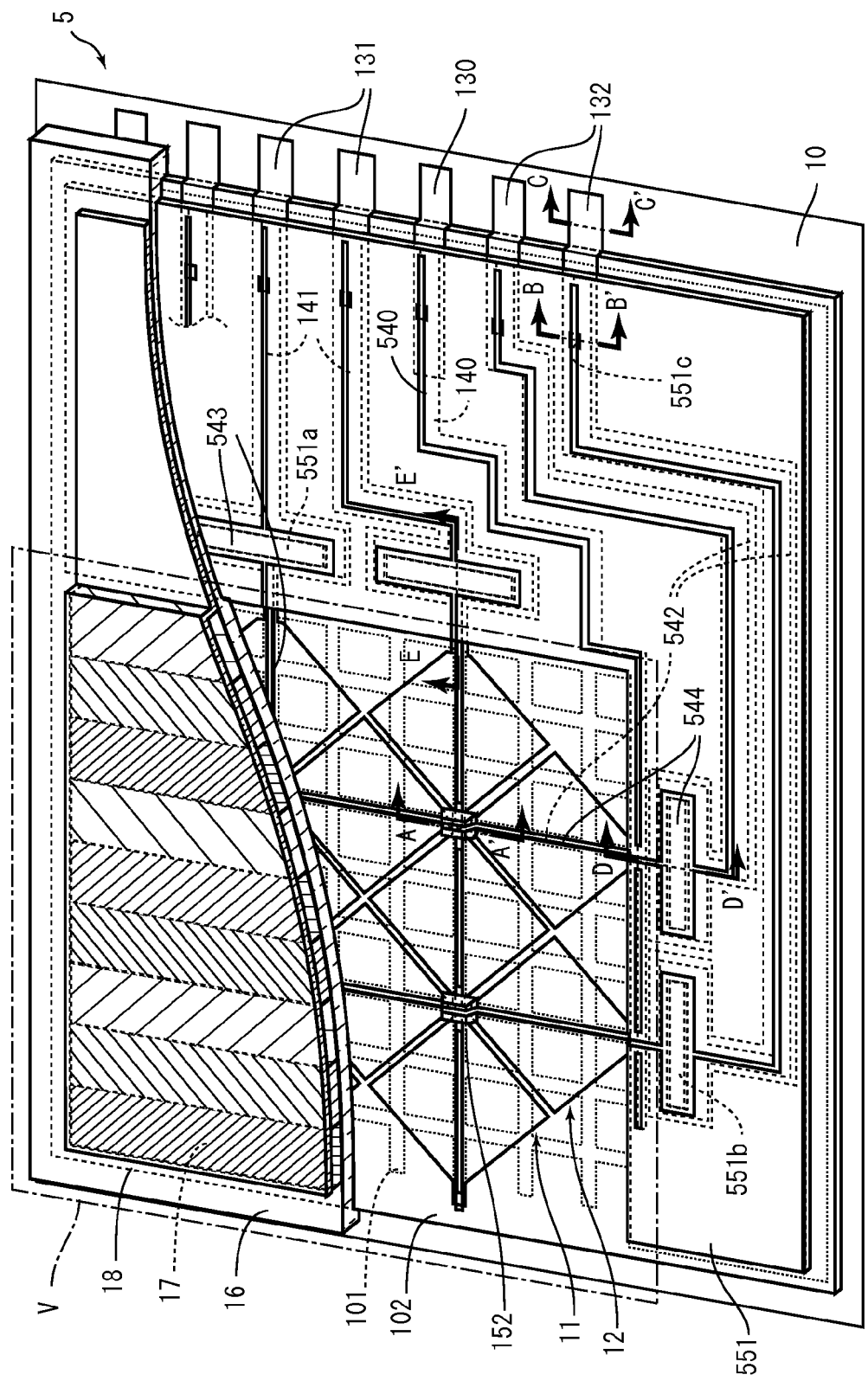
FIG. 13 is a schematic partially cut-away view of a touch panel according to a fifth embodiment of the present invention.
Figure 14:
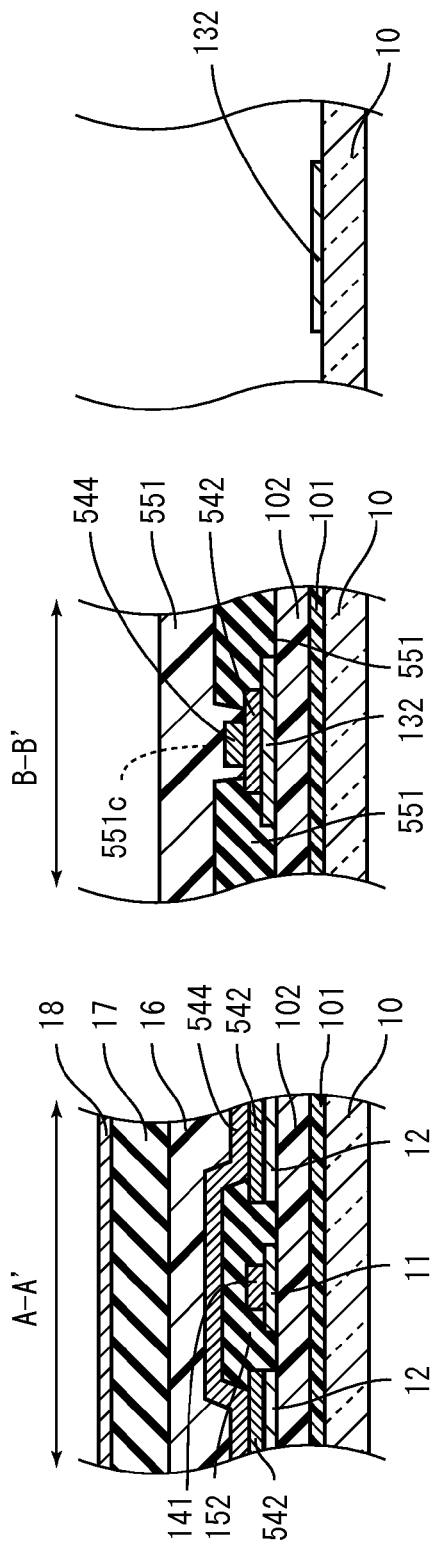
FIG. 14 shows cross-sectional views of the touch panel of FIG. 13 taken along lines A-A', B-B', C-C', D-D' and E-E'.
Figure 14:
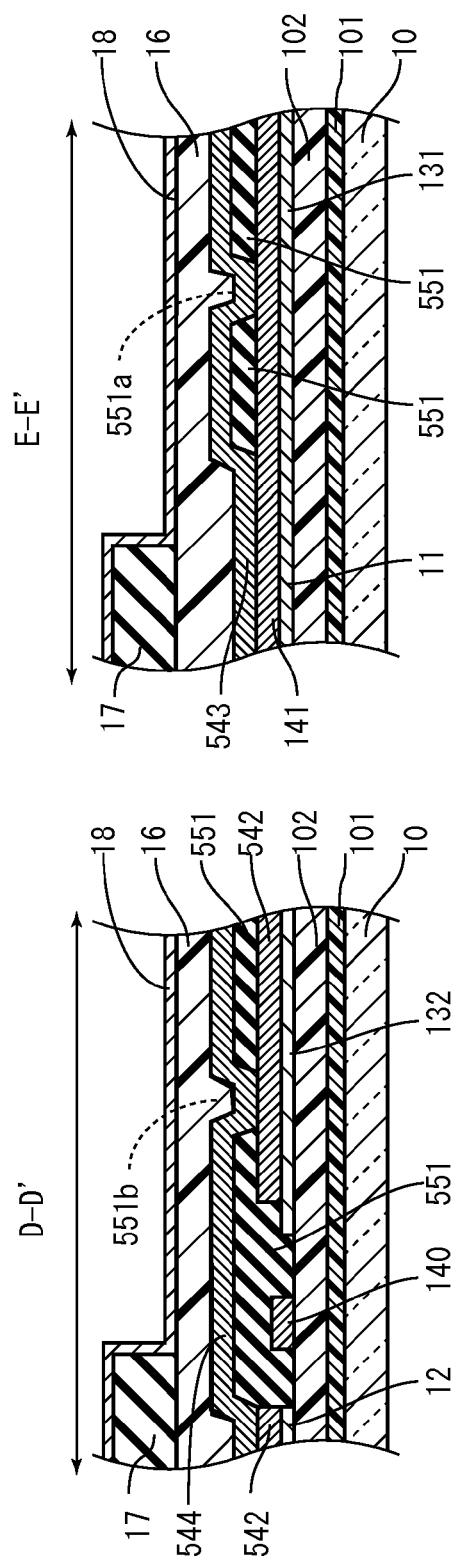

FIG. 13 is a schematic partially cut-away view of a touch panel 5 according to a fifth embodiment of the present invention. FIG. 14 shows cross-sectional views of the touch panel of FIG. 13 taken along lines A-A', B-B', C-C', D-D' and E-E'. The touch panel 5 includes a substrate 10, a black matrix 101, a planarizing film 102, X electrode sets 11, Y electrode sets 12, terminals 130 to 132, lines 140, 141, 540, 542 to 544, insulating films 152 and 551, a protection film 16, a color filter 17 and a common electrode 18.

The touch panel 5 is different from the touch panel 1 in terms of the arrangement of the lines and insulating films.

Figure 15A:
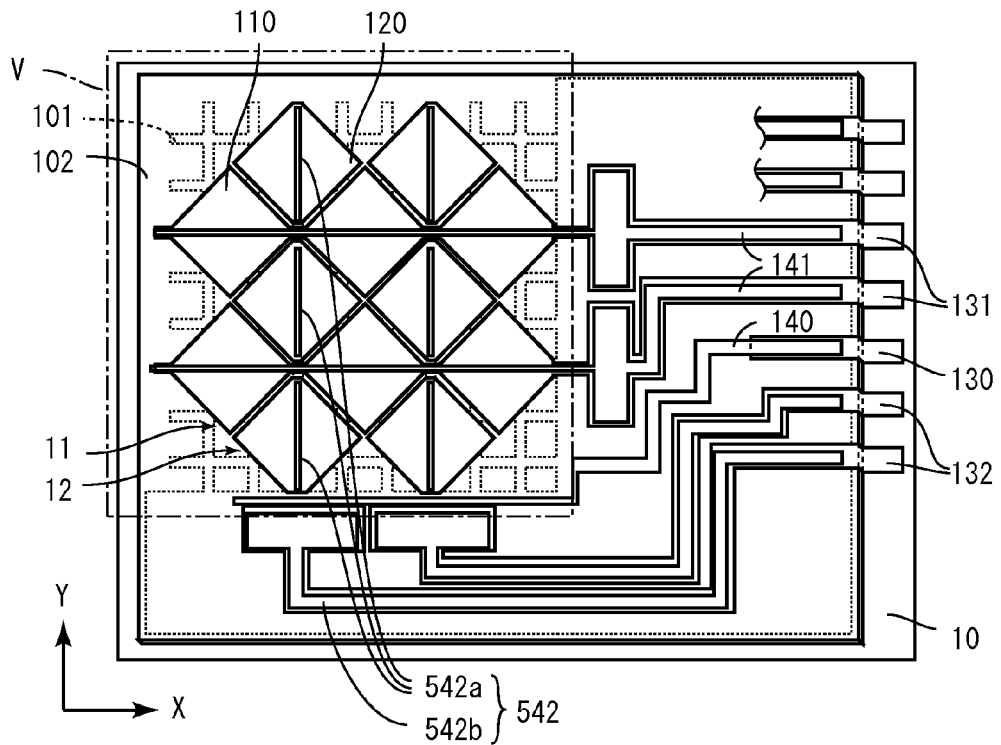
FIG. 15A is a plan view of the substrate, black matrix, planarizing film, X electrode sets, Y electrode sets, terminals and some lines of the touch panel according to the fifth embodiment of the present invention.

FIG. 15A is a view of the substrate 10, black matrix 101, planarizing film 102, X electrode sets 11, Y electrode sets 12, terminals 130 to 132 and lines 140, 141 and 542 of the touch panel 5. The touch panel 5 is different from the touch panel 1 (see FIG. 4C) in that the lines 142 of the touch panel 1 are replaced by the line sets 542.

Similar to the lines 142, each of the line sets 542 partially overlies the corresponding terminal 132. In the display region V, the line set 542 further overlies the corresponding second light-shielding portion 101b of the black matrix 101 and has a smaller width than the second light-shielding portion 101b. The segments of the line set 542 that are located in the display region V (referred to as line set 542a) are separated from each other so as not to be in contact with the lines 141. Further, the line set 542a is not connected with the segment of the line set 542 located outside the display region V, i.e. in the peripheral region (referred to as line 542b).

Similar to the lines 140 to 142 of the touch panel 1, the lines 140, 141 and 542 are formed of the same material during the same step. Similar to the touch panel 1, lines 140, 141 and 542 are formed, and then insulating films 152 and 551 are formed. Thereafter, line sets 540, 543 and 544 are formed.

Figure 15B:
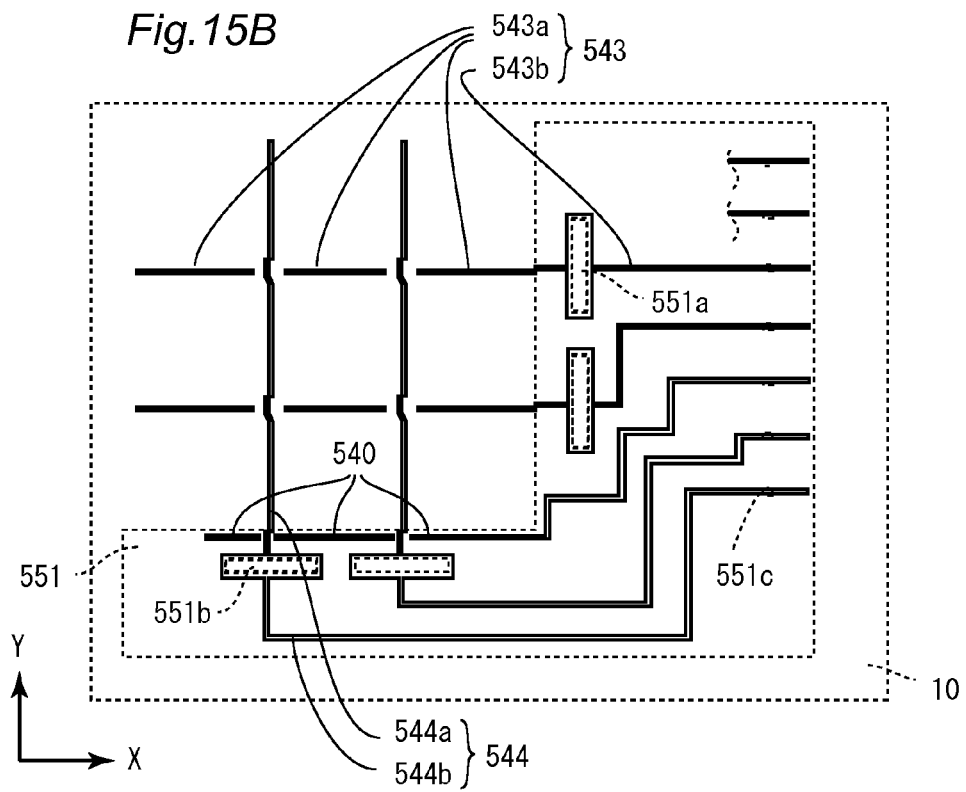
FIG. 15B is a plan view of some lines of the touch panel according to the fifth embodiment of the present invention.

FIG. 15B is a view of the line sets 540, 543 and 544 of the touch panel 5. In FIG. 15B, the substrate 10 and insulating film 551 are suggested by broken lines.

As shown in FIG. 15B, a line set 543 includes a line set 543a located in the display region V and a line 543b located outside the display region V, i.e. in the peripheral region. The lines 543a and 543b are formed continuously and integrally.

Each line set 543a overlies the corresponding first light-shielding portion 101a of the black matrix 101 as in a plan view and has a smaller width than the first light-shielding portion 101a. The segments of the line set 543a are separated from each other so as not to be in contact with the line sets 544.

Each line 543b overlies the corresponding line 141 as in a plan view. The lines 543b and 141 are electrically connected via the corresponding contact holes 551a and 551c formed in the insulating film 551.

Each line set 544 includes a line 544a located in the display region V and a line 544b located outside the display region V, i.e. in the peripheral region. The lines 544a and 544b are formed continuously and integrally.

Each line 544a overlies the corresponding second light-shielding portion 101b of the black matrix 101 as in a plan view and has a smaller width than the second light-shielding portion 101b. Although not shown in FIG. 15B, the line 544a extends over insulating films 152 to be in contact with the line set 542a on the corresponding Y electrode set 12.

Each line 544b overlies the corresponding line 542b as in a plan view. The lines 544b and 542b are electrically connected via the corresponding contact holes 551b and 551c formed in the insulating film 551.

The line set 540 overlies the line 140 as in a plan view. The segments of the line set 540 are separated from each other so as not to be in contact with the line sets 544. The line set 540 and line 140 are electrically connected via the corresponding contact hole 551c formed in the insulating film 551.

Similar to the lines 143 and 144 of the touch panel 1, the line sets 540, 543 and 544 may be formed of the same material during the same step.

In the touch panel 5 according to the present embodiment, each of the lines 141 is in contact with the insular electrodes 110 of the corresponding X electrode set 11. Further, each line set 544 is in contact with the insular electrodes 120 of the corresponding Y electrode set 12. This will increase the conductivity of the X and Y electrode sets 11 and 12, thereby improving sensitivity.

Further, in the present embodiment, a line set 543a overlaps a portion of the corresponding line 141 as in a plan view. This provides a triple redundant construction of an X electrode set 11, a line 141 and a line set 543a. Similarly, a line 542b overlies a portion of the corresponding 544b as in a plan view. This provides a triple redundant construction of a Y electrode set 12 and lines 542b and 544b.

Outside the display region V, i.e. in the peripheral region, a terminal 131, a line 141 and a line 543b overlie as in a plan view to be electrically connected with each other, providing a triple redundant construction. Similarly, a terminal 132, a line set 542 and a line 544b overlie as in a plan view to be electrically connected with each other, providing a triple redundant construction. Further, the line 140 and line set 540 overlie as in a plan view to be connected with each other, providing a redundant construction.

This redundant construction will further reduce resistance as compared with that of the touch panel 1, further increasing the reliability of the lines, improving yield.

Similar to the touch panel 1, the lines 141, 542a, 543a and 544a are shielded by the black matrix 101 and thus are not visible to the viewer, and do not decrease the aperture ratio of the display device 8.

According to the present embodiment, the lines 140, 141 and 542 are formed of the same material during the same step. Further, the line sets 540, 543 and 544 are formed of the same material during the same step. This will reduce the number of times pattering is performed, simplifying the manufacturing process.

Sixth Embodiment

Figure 16:
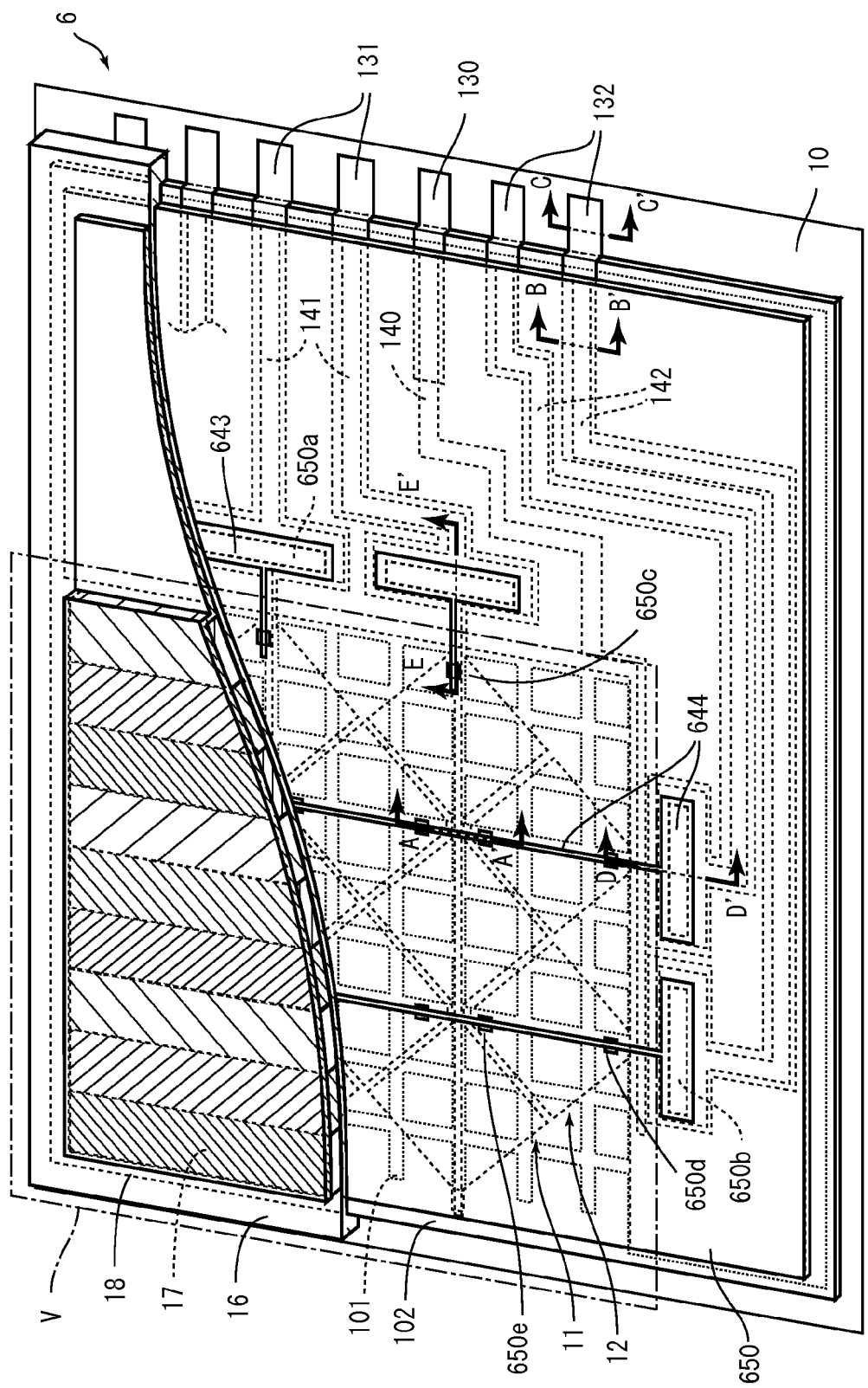
FIG. 16 is a schematic partially cut-away view of a touch panel according to a sixth embodiment of the present invention.
Figure 17:
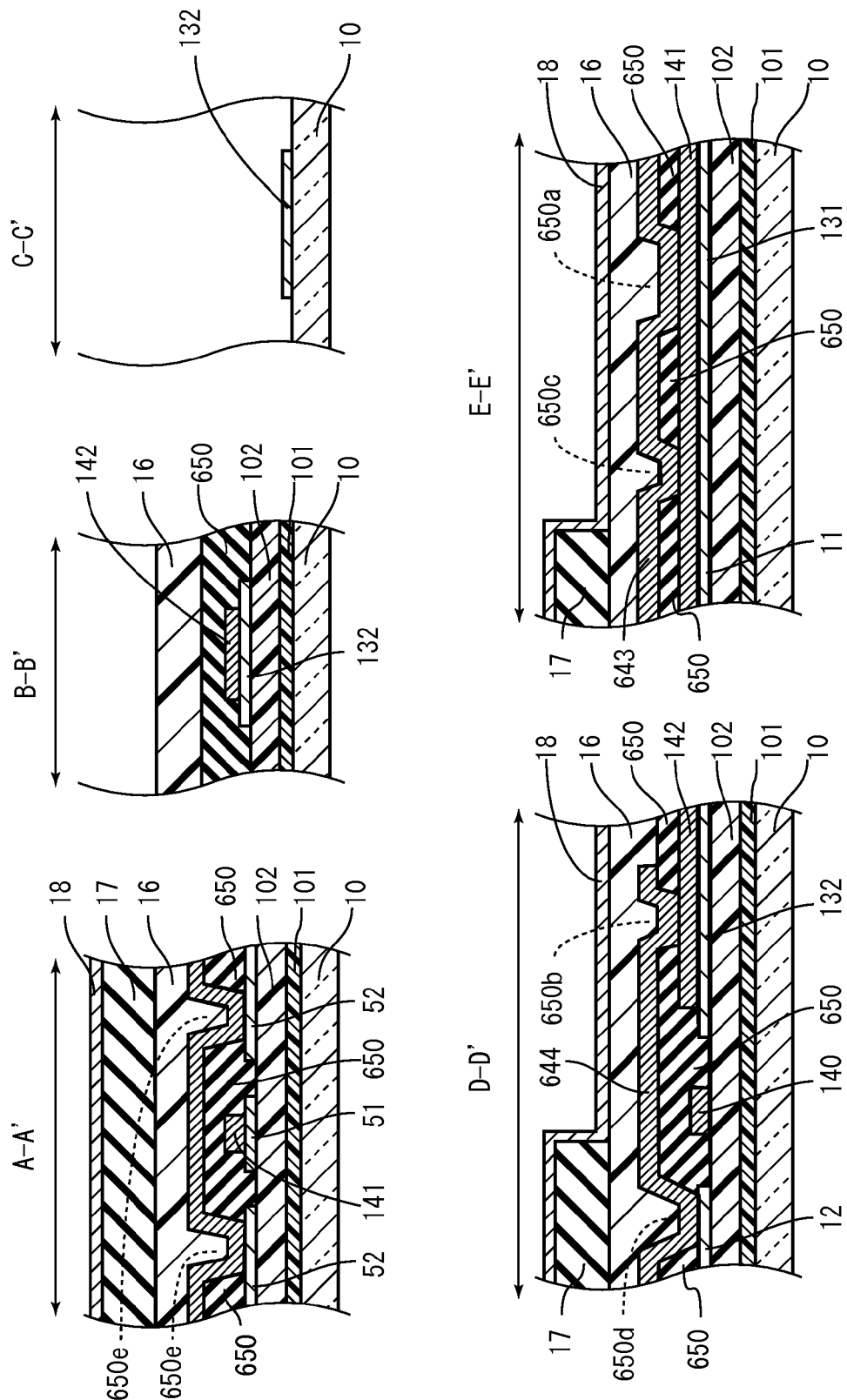
FIG. 17 shows cross-sectional views of the touch panel of FIG. 16 taken along lines A-A', B-B', C-C', D-D' and E-E'.

FIG. 16 is a schematic partially cut-away view of a touch panel 6 according to a sixth embodiment of the present invention. FIG. 17 shows cross-sectional views of the touch panel of FIG. 16 taken along lines A-A', B-B', C-C', D-D' and E-E'. The touch panel 6 includes a substrate 10, a black matrix 101, a planarizing film 102, X electrode sets 11, Y electrode sets 12, terminals 130 to 132, lines 140 to 142, 643 and 644, insulating film 650, a protection film 16, a color filter 17 and a common electrode 18.

The touch panel 6 is different from the touch panel 1 in terms of the arrangement of the lines and insulating films.

As shown in FIG. 16, in the touch panel 6, the insulating film 650 substantially completely covers the planarizing film 102, X electrode sets 11, Y electrode sets 12, terminals 130 to 132 and lines 140 to 142. The insulating film 650 has contact holes 650a to 650e formed therein.

Lines 643 and 644 are provided on the insulating film 650. Each line 643 is electrically connected with the corresponding line 141 via the corresponding contact holes 650a and 650c. Each line 644 is in contact with the corresponding line 142 and Y electrode set 12 via the corresponding contact holes 650b and 650d. Thus, the Y electrode set 12, lines 142 and 644 are electrically connected with each other.

Each line 644 is in contact with the insular electrodes 120 of the corresponding Y electrode set 12 via the corresponding contact hole 650e. Thus, the insular electrodes 120 and line 644 are electrically connected with each other. In the display region V, the line 644 overlies the corresponding second light-shielding portion 101b of the black matrix 101 and has a smaller width than the second light-shielding portion 101b.

This embodiment provides a variation of touch panel configuration.

Seventh Embodiment

Figure 18:
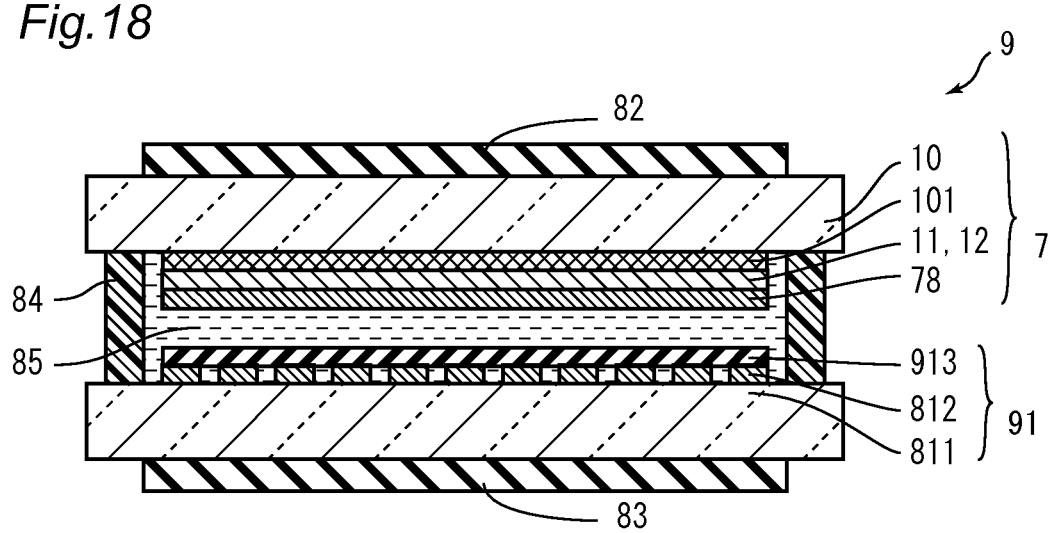
FIG. 18 is a schematic cross-sectional view of a touch panel equipped display device according to another embodiment of the present invention.

FIG. 18 is a schematic cross-sectional view of a touch panel equipped display device 9 according to another embodiment of the present invention. The touch panel equipped display device 9 includes a touch panel 7, a TFT substrate 91, polarizers 82 and 83, seals 84 and liquid crystal 85.

Figure 19:
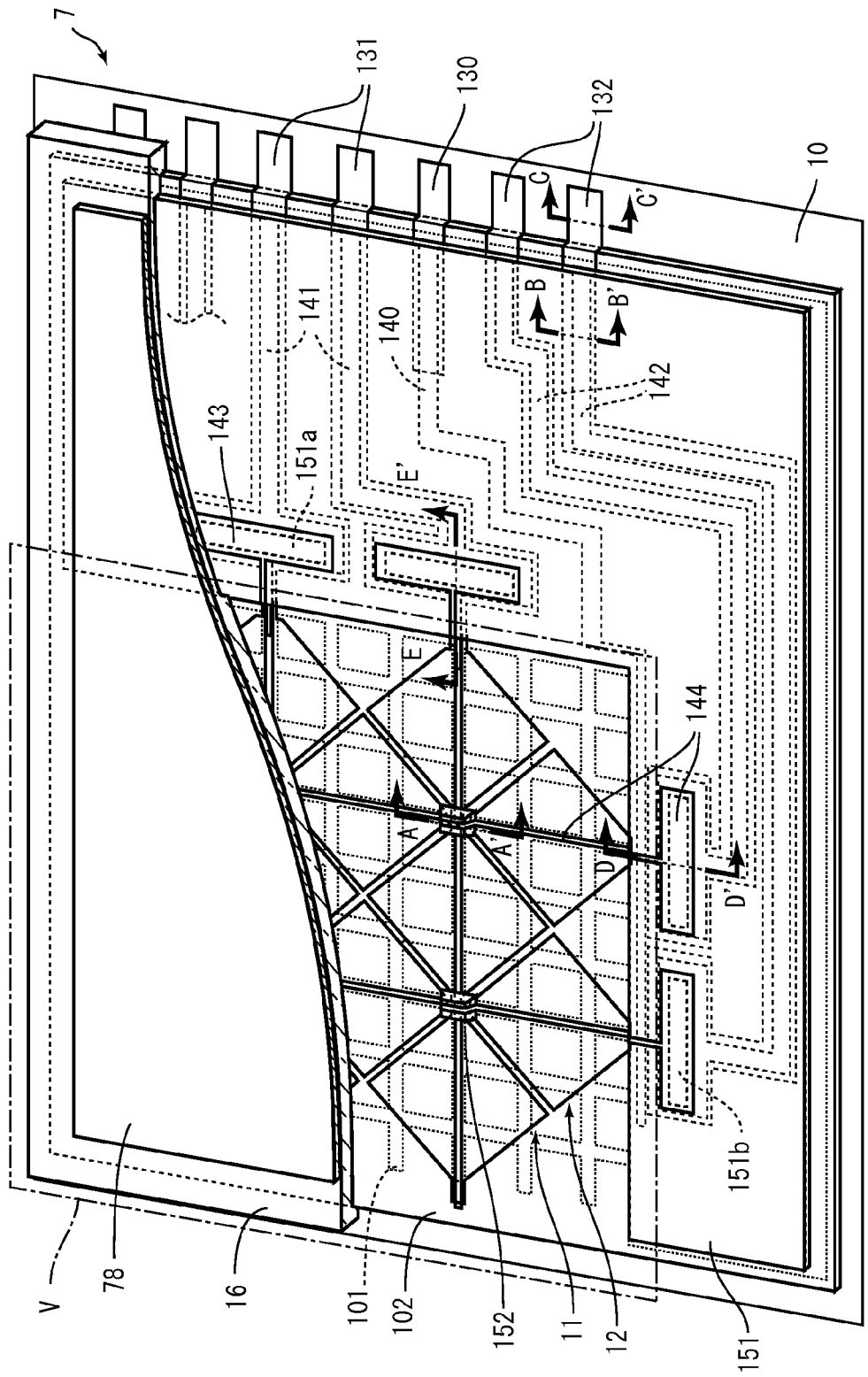
FIG. 19 is a schematic partially cut-away view of a touch panel according to a seventh embodiment of the present invention.
Figure 20:
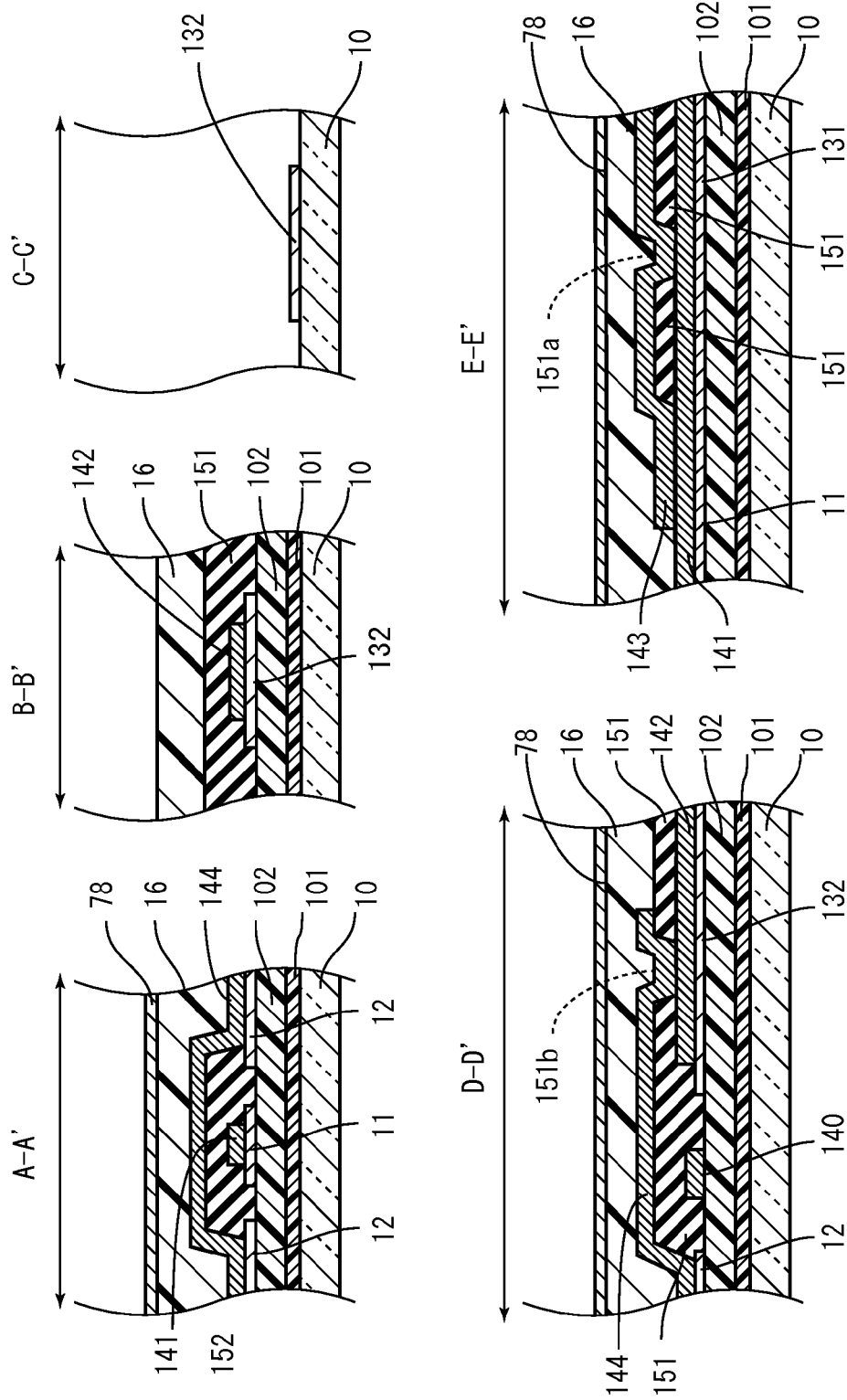
FIG. 20 shows cross-sectional views of the touch panel of FIG. 19 taken along lines A-A', B-B', C-C', D-D' and E-E'.

FIG. 19 is a schematic partially cut-away view of a touch panel 7 according to a seventh embodiment of the present invention. FIG. 20 shows cross-sectional views of the touch panel of FIG. 19 taken along lines A-A', B-B', C-C', D-D' and E-E'. The touch panel 7 includes a substrate 10, a black matrix 101, a planarizing film 102, X electrode sets 11, Y electrode sets 12, terminals 130 to 132, lines 140 to 144, insulating films 151 and 152, a protection film 16 and a common electrode 78.

The touch panel 7 is different from the touch panel 1 in that it does not include a component that would correspond to the color filter 17. In the touch panel 7, the common electrode 78 is located on the protection film 16.

Returning to FIG. 18, the TFT substrate 91 includes a substrate 811, pixel electrodes 812 and a color filter 913.

That is, the touch panel equipped display device 9 has a color filter located adjacent the TFT substrate.

This embodiment will simplify the manufacturing process of the touch panel. This will increase the yield of the touch panel 7.

Other Embodiments

While embodiments of the present invention have been described, the present invention is not limited to the above embodiments, and various modifications are possible within the scope of the invention. Further, embodiments may be combined as necessary to be carried out.

INDUSTRIAL APPLICABILITY

The present invention is industrially useful as an electrostatic capacitance type touch panel or a touch panel equipped display device.

The invention claimed is:

1. A touch panel comprising:
an insulating substrate;
a first light-shielding portion extending in a first direction;
a second light-shielding portion extending in a second direction, the second direction crossing the first direction;
a plurality of first insular electrodes arranged in the first direction;
a plurality of second insular electrodes arranged in the second direction;
a first metal film in contact with the plurality of first insular electrodes and extending in the first direction;
a second metal film in contact with the plurality of second insular electrodes and extending in the second direction; and
an insulating film provided at least at a crossing of the first and second metal films as in a plan view for providing electrical insulation between the first and second metal films,
wherein the first metal film overlies the first light-shielding portion as in a plan view, the first metal film has a smaller width than the first light-shielding portion,
the second metal film overlies the second light-shielding portion as in a plan view, the second metal film has a smaller width than the second light-shielding portion,
the first and second insular electrodes are made of transparent conductive film, and
the insulating film covers the first and second insular electrodes and includes an opening for providing at least one of e) and f): e) a connection between the first insular electrodes and the first metal film; and f) a connection between the second insular electrodes and the second metal film.

2. The touch panel according to claim 1, wherein the first and second light-shielding portions are provided on the substrate,
the touch panel further comprising: a planarizing film covering the first and second light-shielding portions and the substrate.

3. The touch panel according to claim 1, wherein the plurality of first insular electrodes are interconnected in the first direction.

4. The touch panel according to claim 1, wherein the first metal film is located in a layer higher than that of the first insular electrodes and lower than that of the insulating film, and
the second metal film is located in a layer higher than that of the second insular electrodes and that of the insulating film.

5. The touch panel according to claim 1, wherein the first metal film is located in a layer lower than that of the first insular electrodes and that of the insulating film, and
the second metal film is located in a layer higher than that of the second insular electrodes and that of the insulating film.

6. The touch panel according to claim 1, wherein the first metal film is located in a layer higher than that of the first insular electrodes and that of the insulating film, and
the second metal film is located in a layer lower than that of the second insular electrodes and that of the insulating film.

7. The touch panel according to claim 1, further comprising: a third metal film in contact with at least one of a) and b): a) the first insular electrodes; and b) the first metal film, the third metal film overlying the first light-shielding portion as in a plan view and having a smaller width than the first light-shielding portion.

8. The touch panel according to claim 1, further comprising: a fourth metal film in contact with at least one of c) and d): c) the second insular electrodes; and d) the second metal film, the fourth metal film overlying the second light-shielding portion as in a plan view and having a smaller width than the second light-shielding portion.

9. The touch panel according to claim 1, further comprising: a line made of the same material as at least one of the first and second metal films.

10. The touch panel according to claim 9, further comprising: a transparent conductive film in contact with the line and overlying the line as in a plan view.

11. The touch panel according to claim 9, further comprising: a fifth metal film in electrical contact with the line and located in a layer different from that for the line.

12. The touch panel according to claim 1, further comprising: a color filter layer.

13. A touch panel comprising:
an insulating substrate;
a first light-shielding portion extending in a first direction;
a second light-shielding portion extending in a second direction, the second direction crossing the first direction;
a plurality of first insular electrodes arranged in the first direction;
a plurality of second insular electrodes arranged in the second direction;
a first metal film in contact with the plurality of first insular electrodes and extending in the first direction;
a second metal film in contact with the plurality of second insular electrodes and extending in the second direction;
an insulating film provided at least at a crossing of the first and second metal films as in a plan view for providing electrical insulation between the first and second metal films; and
a color filter layer,
wherein the first metal film overlies the first light-shielding portion as in a plan view, the first metal film has a smaller width than the first light-shielding portion, the second metal film overlies the second light-shielding portion as in a plan view, the second metal film has a smaller width than the second light-shielding portion,
the first and second insular electrodes are made of transparent conductive film, and
the insulating film has a width as measured in the first direction that is smaller than a width of the second light-shielding portion, or has a width as measured in the second direction that is smaller than a width of the first light-shielding portion.

14. A touch panel equipped display device comprising:
the touch panel according to claim 1;
a common electrode provided on the touch panel;
a thin-film transistor substrate provided to pair up with the touch panel; and
liquid crystal sandwiched between the touch panel and the thin-film transistor substrate.

15. The touch panel equipped display device according to claim 14, wherein the thin-film transistor substrate includes an oxide semiconductor layer containing indium gallium zinc oxide.

16. The touch panel according to claim 13, wherein the first metal film is located in a layer higher than that of the first insular electrodes and lower than that of the insulating film, and
the second metal film is located in a layer higher than that of the second insular electrodes and that of the insulating film.

17. The touch panel according to claim 13, wherein the first metal film is located in a layer lower than that of the first insular electrodes and that of the insulating film, and
the second metal film is located in a layer higher than that of the second insular electrodes and that of the insulating film.

18. The touch panel according to claim 13, wherein the first metal film is located in a layer higher than that of the first insular electrodes and that of the insulating film, and
the second metal film is located in a layer lower than that of the second insular electrodes and that of the insulating film.

* * * * *